US008423222B2

(12) United States Patent
Hisada et al.

(10) Patent No.: US 8,423,222 B2
(45) Date of Patent: Apr. 16, 2013

(54) VEHICLE DRIVE DEVICE

(75) Inventors: Hideki Hisada, Kawasaki (JP); Masaki Yoshida, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 0 days.

(21) Appl. No.: 13/448,889

(22) Filed: Apr. 17, 2012

(65) Prior Publication Data

US 2012/0265387 A1    Oct. 18, 2012

(30) Foreign Application Priority Data

Apr. 18, 2011 (JP) ................................. 2011-091953

(51) Int. Cl.
*B60W 20/00* (2006.01)

(52) U.S. Cl.
USPC .................................. 701/22; 701/51; 701/54

(58) Field of Classification Search .................... 701/22, 701/51, 54
See application file for complete search history.

(56) References Cited

U.S. PATENT DOCUMENTS

| 5,804,711 | A  | * | 9/1998  | Remboski et al. ......... 73/114.05 |
| 5,947,862 | A  | * | 9/1999  | Knapp et al. ..................... 477/46 |
| 6,438,945 | B1 | * | 8/2002  | Takagi et al. .................... 60/283 |
| 6,722,456 | B2 |   | 4/2004  | Hisada |
| 8,224,544 | B2 | * | 7/2012  | Sah et al. ........................ 701/68 |
| 8,255,131 | B2 | * | 8/2012  | Porta et al. ...................... 701/55 |
| 2004/0230367 | A1 | * | 11/2004 | Miller et al. ................... 701/111 |
| 2005/0120784 | A1 | * | 6/2005  | Fehrenbach et al. ......... 73/117.3 |
| 2008/0071450 | A1 | * | 3/2008  | Kurrle et al. .................... 701/67 |
| 2009/0118990 | A1 | * | 5/2009  | Suzuki ............................ 701/111 |
| 2009/0183559 | A1 | * | 7/2009  | Birk et al. .................. 73/114.27 |
| 2009/0216413 | A1 | * | 8/2009  | Baldet et al. .................... 701/54 |

FOREIGN PATENT DOCUMENTS

| JP | A-2002-012046 | 1/2002 |
| JP | A-2010-076678 | 4/2010 |

* cited by examiner

*Primary Examiner* — Hussein A. Elchanti
(74) *Attorney, Agent, or Firm* — Oliff & Berridge, PLC

(57) ABSTRACT

A vehicle drive device includes a first rotating electrical machine, an input member, and an output member drivingly coupled to different rotating elements of a differential gear unit. A second rotating electrical machine is coupled to a different rotating element of the differential gear unit than the first rotating electrical machine. A control device detects an output rotation abrupt change where an absolute value of rotational acceleration of the output member is equal to or larger than a predetermined value, and, if the output rotation abrupt change state is detected where a rotational speed of the input rotating element is lower than a threshold value, the control device executes restriction avoidance where a rotational speed of the first rotating electrical machine is controlled so that the rotational speed of a input rotating element becomes equal to or higher than the threshold value.

22 Claims, 9 Drawing Sheets

F I G . 3
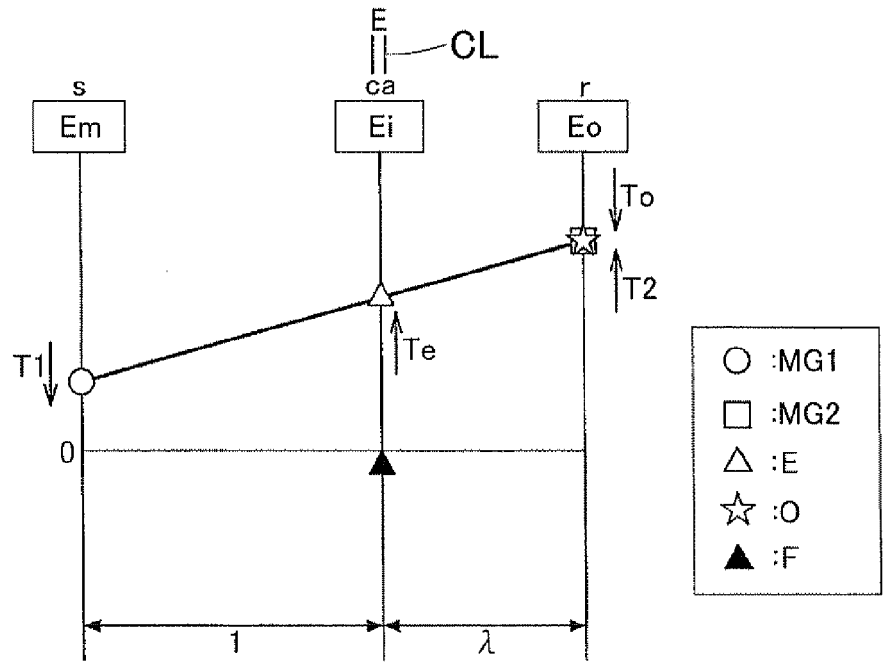
F I G . 4
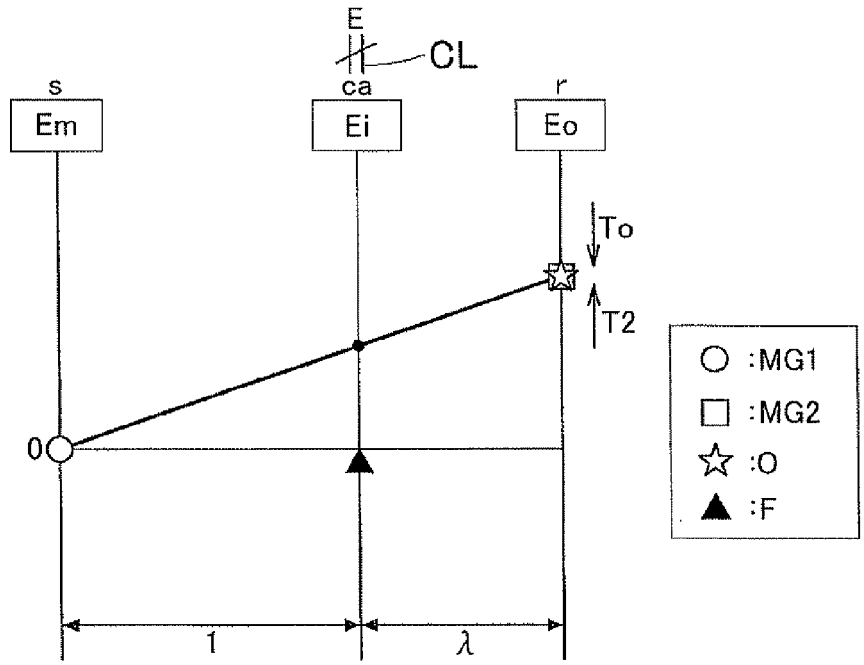

VEHICLE DRIVE DEVICE

INCORPORATION BY REFERENCE

The disclosure of Japanese Patent Application No. 2011-091953 filed on Apr. 18, 2011 including the specification, drawings and abstract is incorporated herein by reference in its entirety.

BACKGROUND OF THE INVENTION

The present invention relates to vehicle drive devices including an input member that is drivingly coupled to an internal combustion engine, an output member that is drivingly coupled to wheels, a first rotating electrical machine, a second rotating electrical machine, a differential gear unit that has at least three rotating elements, and a control device.

DESCRIPTION OF THE RELATED ART

Related art of such vehicle drive devices includes a technique described in, e.g., the following Japanese Patent Application Publication No. 2002-12046 (JP 2002-12046 A). In JP 2002-12046 A, a configuration is described in which a differential gear unit is formed by a planetary gear mechanism having three rotating elements, a first rotating electrical machine is drivingly coupled to a sun gear, an input member is drivingly coupled to a carrier, and a second rotating electrical machine and an output member are drivingly coupled to a ring gear. This vehicle drive device includes a one-way clutch that restricts negative rotation of the carrier and the input member that are drivingly coupled to each other so as to rotate together, and has a drive mode in which the one-way clutch restricting the negative rotation of the carrier and the input member receives a reaction force of torque of the first rotating electrical machine, and transmits the torque of the first rotating electrical machine to the output member to cause the vehicle to run.

For example, if the rotational speed of the output member decreases rapidly during running of the vehicle in this drive mode, the one-way clutch restricting the negative rotation may further be subjected to torque in a negative direction and thus may be momentarily subjected to a large load. In JP 2002-12046 A, in view of this point, a control device is configured to determine whether failure has occurred in the one-way clutch or not based on a detection value of the rotational speed of the internal combustion engine. Thus, even if failure has occurred in the one-way clutch, the driver is prevented from continuing to drive the vehicle without recognizing the occurrence of the failure.

However, the technique of JP 2002-12046 A is only intended to determine whether failure has occurred in the one-way clutch or not, and is not intended to prevent possible occurrence of the failure. In order to actively suppress occurrence of such failure, the one-way clutch itself can be designed to have high strength, or a separate impact absorbing mechanism such as a damper or a torque limiter can be provided. However, taking such measures increases manufacturing cost of the device and also increases the weight thereof.

SUMMARY OF THE INVENTION

Problem to be Solved by the Invention

Accordingly, it is desired to implement a vehicle drive device capable of effectively suppressing occurrence of failure of a one-way clutch while suppressing an increase in manufacturing cost and an increase in weight.

A vehicle drive device according to a first aspect of the present invention includes: an input member drivingly coupled to an internal combustion engine; an output member drivingly coupled to wheels; a first rotating electrical machine; a second rotating electrical machine; a differential gear unit having at least three rotating elements; a control device; and a one-way clutch that restricts negative rotation of the input rotating element. In the vehicle drive device, the first rotating electrical machine, the input member, and the output member are respectively drivingly coupled to the different rotating elements of the differential gear unit with none of the rotating elements of the differential gear unit other than the coupled rotating element interposed therebetween, the second rotating electrical machine is drivingly coupled to one of the rotating elements of the differential gear unit other than the rotating element to which the first rotating electrical machine is drivingly coupled and the input rotating element to which the input member is drivingly coupled, with none of the remaining rotating elements of the differential gear unit interposed therebetween. Further, in the vehicle drive device, the control device includes a rotation change detecting portion that detects an output rotation abrupt change state in which an absolute value of rotational acceleration of the output member is equal to or larger than a predetermined value, and a restriction avoidance control portion that executes, if the output rotation abrupt change state is detected in a low rotation state in which a rotational speed of the input rotating element is lower than a predetermined control threshold value, restriction avoidance control in which a rotational speed of the first rotating electrical machine is controlled so that the rotational speed of the input rotating element becomes equal to or higher than the control threshold value.

In the present application, the expression "drivingly coupled" refers to the state in which two rotating elements are coupled to each other so as to be able to transmit a driving force therebetween, and is used as a concept including the state in which the two rotating elements are coupled to each other so as to rotate together, or the state in which the two rotating elements are coupled to each other so as to be able to transmit the driving force therebetween via one or more transmission members. Such transmission members include various members that transmit rotation at the same speed or at a shifted speed, and include, e.g., a shaft, a gear mechanism, a belt, and a chain. Such transmission members may include an engagement element that selectively transmits rotation and a driving force, such as a friction engagement element and a meshing type engagement element. Note that the term "driving force" is herein used as a synonym for "torque."

In the present application, a differential gear mechanism including three rotating elements, such as a planetary gear mechanism including a sun gear, a carrier, and a ring gear, is used, and this differential gear mechanism individually or a device obtained by combining a plurality of differential gear mechanisms is referred to as the "differential gear unit."

In the present application, the "rotating electrical machine" is used as a concept including a motor (an electric motor), a generator (an electric generator), and a motor-generator that functions both as the motor and the generator as necessary.

According to the first aspect, the restriction avoidance control is executed if it is detected that the output rotation abrupt change state is established when the rotational acceleration, which is a rate of time change in rotational speed of the output member, abruptly changes in a positive or negative direction by a predetermined value or more, while a vehicle is running in the low rotation state in which the rotational speed of the input rotating element is lower than the predetermined control threshold value. In the restriction avoidance control, the rotational speed of the first rotating electrical machine is controlled to make the rotational speed of the input rotating element of the differential gear unit equal to or higher than the control threshold value, whereby the state can be reliably implemented in which engagement members located on both sides of the one-way clutch rotate relative to each other. Thus, even if an actual rotational speed of the output member rapidly decreases in the output rotation abrupt change state, the possibility is reduced that the rotational speed of the input rotating element may decrease to zero and negative rotation may be restricted by the one-way clutch, and thus the possibility is reduced that the one-way clutch may be subjected to a large load. This can effectively suppress occurrence of failure of the one-way clutch.

In the above first aspect, occurrence of failure of the one-way clutch can be effectively suppressed by executing the restriction avoidance control. Thus, it is neither necessary to design the one-way clutch itself with high strength, nor to provide a separate impact absorption mechanism such as a damper or a torque limiter. This can suppress an increase in manufacturing cost and an increase in weight.

Accordingly, the vehicle drive device can be implemented which can effectively suppress occurrence of failure of the one-way clutch while suppressing an increase in manufacturing cost and an increase in weight.

According to a second aspect of the present invention, the control threshold value may be a value equal to or larger than a variation in the rotational speed of the input rotating element in the negative direction in the output rotation abrupt change state.

According to the second aspect, even if the rotational speed of the input rotating element abruptly changes in the negative direction in the output rotation abrupt change state, the state in which negative rotation of the input rotating element is restricted by the one-way clutch can be effectively avoided. This can more reliably reduce the possibility that the one-way clutch may be subjected to a large load.

According to a third aspect of the present invention, target rotational speed data may be provided in advance which defines a relation between a rotational speed of the output member and a target rotational speed of the first rotating electrical machine that makes the rotational speed of the input rotating element equal to or higher than the control threshold value, and the restriction avoidance control portion may determine the target rotational speed of the first rotating electrical machine based on the target rotational speed data and the actual rotational speed of the output member, and control the rotational speed of the first rotating electrical machine so that the rotational speed of the first rotating electrical machine becomes equal to the target rotational speed.

According to the third aspect, the target rotational speed of the first rotating electrical machine can be easily and appropriately determined according to the vehicle speed, based on the target rotational speed data that defines in advance the relation between the rotational speed of the output member and the target rotational speed of the first rotating electrical machine. The rotational speed of the first rotating electrical machine is controlled so as to become equal to the determined target rotational speed, whereby the rotational speed of the input rotating element can be reliably made equal to or higher than the control threshold value. This can more reliably reduce the possibility that the one-way clutch may be subjected to a large load.

According to a fourth aspect of the present invention, the restriction avoidance control portion may determine the target rotational speed of the first rotating electrical machine based on the actual rotational speed of the output member, the control threshold value, and a gear ratio of the differential gear unit, and control the rotational speed of the first rotating electrical machine so that the rotational speed of the first rotating electrical machine becomes equal to the target rotational speed.

According to the fourth aspect, the target rotational speed of the first rotating electrical machine can be more appropriately determined by calculation according to the vehicle speed, based on the relation with the control threshold value and the gear ratio of the differential gear unit. Moreover, the rotational speed of the first rotating electrical machine is controlled so as to become equal to the determined target rotational speed, whereby the rotational speed of the input rotating element can be reliably made equal to or higher than the control threshold value. This can more reliably reduce the possibility that the one-way clutch may be subjected to a large load.

According to a fifth aspect of the present invention, the rotation change detecting portion may detect the output rotation abrupt change state by detecting that the rotational acceleration of the output member is equal to or higher than a predetermined abrupt change threshold value that is set to a value that is larger in the negative direction than the rotational acceleration of the output member according to vehicle negative acceleration during braking of the vehicle.

According to the fifth aspect, the output rotation abrupt change state can be directly and quickly detected by comparing the rotational acceleration of the output member with the abrupt change threshold value that is set to the predetermined value.

According to a sixth aspect of the present invention, the rotation change detecting portion may detect the output rotation abrupt change state by detecting activation of an antilock brake system of the vehicle.

According to the sixth aspect, it can be detected by monitoring the command to operate the antilock brake system of the vehicle that the output rotation abrupt change state is very likely to be established, and no special determining unit is required for this detection.

According to a seventh aspect of the present invention, the restriction avoidance control portion may terminate the restriction avoidance control if the rotation change detecting portion does not additionally detect the output rotation abrupt change state before a predetermined termination determination time elapses after detection of the output rotation abrupt change state.

In the case where the rotational acceleration of the output member is maintained at a value less than a predetermined value with no output rotation abrupt change state being detected over the predetermined termination determination time or more, the state of the vehicle is stable, and the output rotation abrupt change state is less likely to be established again. According to the above configuration, the restriction avoidance control is prevented from being continued unnecessarily, whereby the first rotating electrical machine etc. can be appropriately controlled according to the situation.

According to an eighth aspect of the present invention, rotational speeds of the at least three rotating elements of the differential gear unit may be in an order of the rotating element to which the first rotating electrical machine is drivingly coupled, the input rotating element, and the rotating element to which the output member is drivingly coupled.

Note that the "order of the rotational speeds" refers to either the order from a higher speed to a lower speed or the order from a lower speed to a higher speed. Although either one of the orders is possible depending on the rotating state of each differential gear mechanism, the order of the rotating elements is the same in either case. That is, the "order of the rotational speeds" means that the "descending or ascending order of the rotational speeds when each rotating element is in the rotating state." Note that the "order of the rotational speeds" is the same as the order of arrangement in the speed diagram (the collinear diagram) of each rotating element. The "order of arrangement in the speed diagram (the collinear diagram) of each rotating element" refers to the order in which axes corresponding to the rotating elements are arranged in the speed diagram.

According to the eighth aspect, a split drive mode can be implemented in which the vehicle is driven via the output member and the wheels while generating electric power by the first rotating electrical machine, by using a driving force of the internal combustion engine drivingly coupled to the input member. Moreover, an electric drive mode can be implemented in which the vehicle is driven by using a driving force of the second rotating electrical machine with the internal combustion engine in a combustion stop state. The electric drive mode may further include a mode (herein referred to as the "second electric drive mode") in which, with the rotational speed of the input rotating element restricted to zero by the one-way clutch, a driving force of the first rotating electrical machine is transmitted to the output member to assist in driving the vehicle.

For example, in the second electric drive mode, the rotational speed of the input rotating element is zero, and the low rotation state is always established in which the rotational speed of the input rotating element is lower than the control threshold value. Thus, if the rotational acceleration of the output member decreases rapidly during running in the second electric drive mode, the input rotation element may be immediately subjected to a load. In this regard, as described above, the present invention can effectively reduce the possibility that the one-way clutch may be subjected to a large load. Thus, the present invention is particularly suitable when applied to a vehicle drive device having the above configuration and capable of implementing the second electric drive mode.

According to a ninth aspect of the present invention, the vehicle drive device may further include a friction engagement device capable of canceling driving coupling between the input member and the input rotating element coupled to the one-way clutch.

According to the ninth aspect, the input rotating element can be separated from the input member drivingly coupled to the internal combustion engine. Thus, the rotational speed of the first rotating electrical machine can be controlled with no friction resistance inside the internal combustion engine during execution of the restriction avoidance control, thereby reducing the time for the rotational speed of the input rotating element to become equal to or higher than the control threshold value. This can more reliably reduce the possibility that the one-way clutch may be subjected to a large load.

In this configuration, in the case where the electric drive mode can be implemented in which the vehicle is driven by using the driving force of the second rotating electrical machine with the internal combustion engine in the combustion stop state, the friction engagement device can be brought into the disengaged state and the internal combustion engine can be separated from the wheels during running of the vehicle in the electric drive mode. This can improve energy efficiency in the electric drive mode.

BRIEF DESCRIPTION OF THE DRAWINGS

FIG. 3 is a speed diagram representing an operating state of a differential gear unit in a hybrid drive mode;

FIG. 4 is a speed diagram representing an operating state of the differential gear unit in a first electric drive mode;

DETAILED DESCRIPTION OF THE EMBODIMENTS

Figure 1:
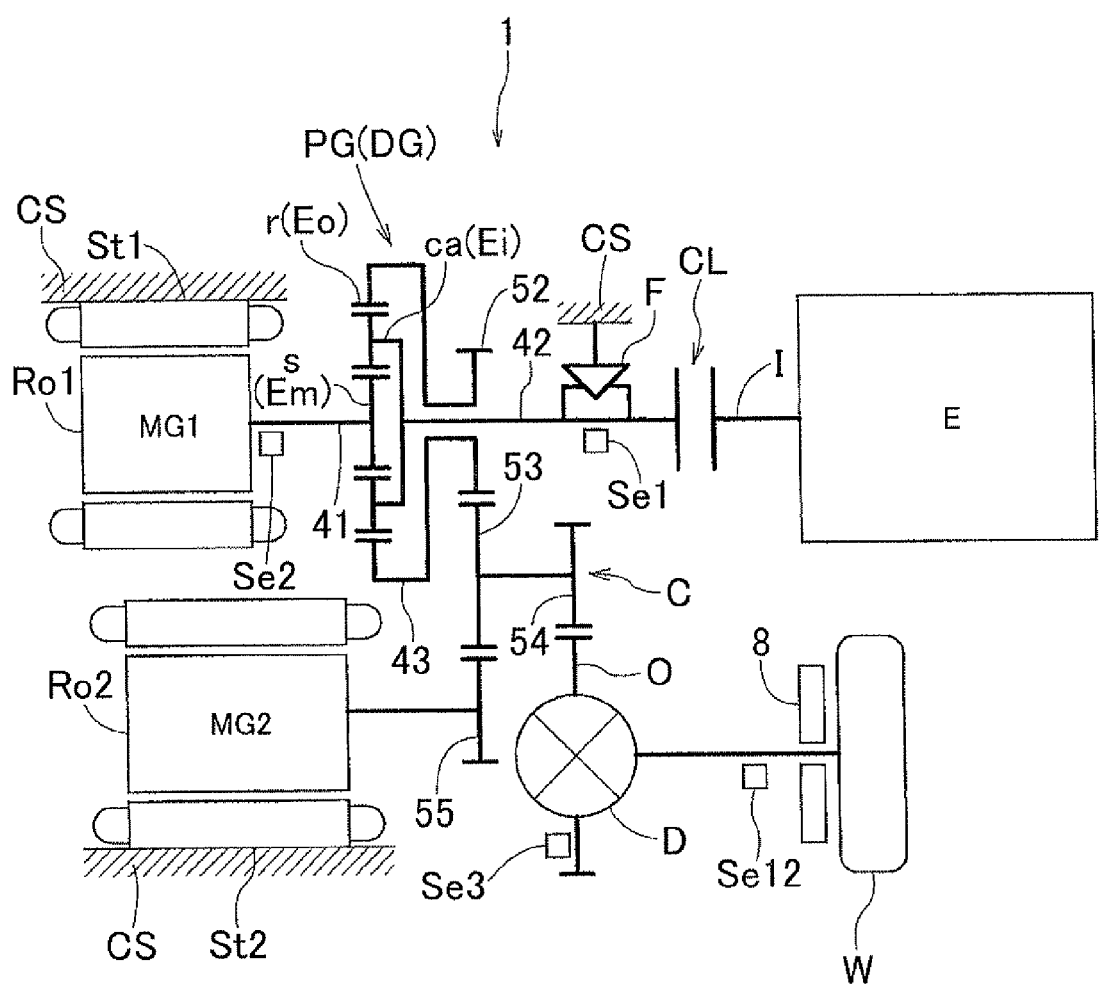
FIG. 1 is a skeleton diagram showing a mechanical configuration of a vehicle drive device according to an embodiment of the present invention.

An embodiment of a vehicle drive device according to the present invention will be described below with reference to the accompanying drawings. As shown in FIG. 1, a vehicle drive device 1 according to the embodiment is a drive device (a drive device for hybrid vehicles) configured to drive a vehicle (a hybrid vehicle) including both an internal combustion engine E and rotating electrical machines MG1, MG2 as driving force sources of wheels W. The vehicle drive device 1 according to the present embodiment includes a control device 70 (see FIG. 2), and the control device 70 controls operation of each driving force source etc. based on the system configuration shown in FIG. 2. Note that in FIG. 2, broken lines represent transmission paths of electric power, and solid arrows represent transmission paths of various information.

As shown in FIG. 1, in the present embodiment, a differential gear unit DG included in the vehicle drive device 1 is formed by a planetary gear mechanism PG having a sun gear s, a carrier ca, and a ring gear r as rotating elements. The first rotating electrical machine MG1 is drivingly coupled to the sun gear s, an input member I is drivingly coupled to the carrier ea, and the second rotating electrical machine MG2 and an output member O are drivingly coupled to the ring gear r, with none of the other rotating elements of the planetary gear mechanism PG interposed therebetween. Note that the input member I is drivingly coupled to the internal combustion engine E, and the output member O is drivingly coupled to the wheels W.

The vehicle drive device I includes a friction engagement device CL capable of canceling driving coupling between the input member I and the carrier ca, and further includes a one-way clutch F that restricts negative rotation of the carrier ca. This allows the internal combustion engine E to be disconnected when executing an electric drive mode in which, with the internal combustion engine E stopped, an output torque of the second rotating electrical machine MG2 is transmitted to the output member O to drive the wheels W, and thus allows energy efficiency to be improved by avoiding idling (dragging) of the first rotating electrical machine MG1. If the output torque of the second rotating electrical machine MG2 is not enough to drive the wheels W, a drive mode (a second electric drive mode as a type of electric drive mode) can be executed in which, with the one-way clutch F being in a negative-rotation restricting state, an output torque of the first rotating electrical machine MG1 is transmitted to the output member O to assist in driving the wheels W.

In this configuration, the vehicle drive device 1 according to the present embodiment is characterized in that the vehicle drive device 1 is capable of executing restriction avoidance control in order to suppress possible occurrence of failure of the one-way clutch F under a specific condition. The vehicle drive device 1 according to the present embodiment will be described in detail below.

1. Mechanical Configuration of Vehicle Drive Device

First, the mechanical configuration of the vehicle drive device 1 according to the present embodiment will be described. The vehicle drive device 1 includes: the input member I that is drivingly coupled to the internal combustion engine E; the output member O that is drivingly coupled to the wheels W; the first rotating electrical machine MG1; the second rotating electrical machine MG2; the differential gear unit DG having at least three rotating elements; and the control device 70. The vehicle drive device 1 according to the present embodiment is configured as a so-called 2-motor split type drive device for hybrid vehicles, which includes the power-distributing differential gear unit DG for distributing an output torque of the internal combustion engine E toward the first rotating electrical machine MG1 and toward the wheels W and the second rotating electrical machine MG2.

As shown in FIG. 1, in the present embodiment, the differential gear unit DG is formed by the single-pinion type planetary gear mechanism PG. That is, in this example, the differential gear unit DG has three rotating elements. Specifically, the differential gear unit DG has the sun gear s, the carrier ca, and the ring gear r. As described below, the input member I, the output member O, and the first rotating electrical machine MG1 are drivingly coupled to the different rotating elements of the differential gear unit DG, respectively, with none of the other rotating elements of the differential gear unit DG interposed therebetween. In this example, the first rotating electrical machine MG1 is drivingly coupled to the sun gear s, the input member I is drivingly coupled to the carrier ca, and the output member O is drivingly coupled to the ring gear r.

As used herein, the "input rotating element Ei" refers to the rotating element to which the input member I is drivingly coupled, the "output rotating element Eo" refers to the rotating element to which the output member O is drivingly coupled, and the "first rotating electrical machine-coupled element Em" refers to the rotating element to which the first rotating electrical machine MG1 is drivingly coupled. In the present embodiment, the sun gear s may function as the first rotating electrical machine-coupled element Em, the carrier ca may function as the input rotating element Ei, and the ring gear r may function as the output rotating element Eo. In the present embodiment, the rotational speeds of the three rotating elements of the differential gear unit DG are in the order of the sun gear s, the carrier ca, and the ring gear r (see FIG. 3 etc.). In other words, the rotational speeds of the three rotating elements of the differential gear unit DG are in the order of the first rotating electrical machine-coupled element Em, the input rotating element Ei, and the output rotating element Eo.

The second rotating electrical machine MG2 is drivingly coupled to the rotating element (in this example, the ring gear r serving as the output rotating element Eo) of the differential gear unit DG other than the input rotating element Ei (the carrier ca) and the first rotating electrical machine-coupled element Em (the sun gear s), with none of the other rotating elements of the differential gear unit DG interposed therebetween. The vehicle drive device 1 includes the friction engagement device CL capable of canceling driving coupling between the input member I and the input rotating element Ei (the carrier ea). The vehicle drive device 1 further includes the one-way clutch F that restricts negative rotation of the input rotating element Ei (the carrier Ca).

Note that coupling members, each configured to rotate together with a corresponding one of the rotating elements, are coupled to the rotating elements of the differential gear unit DG, respectively. Specifically, as shown in FIG. 1, a first coupling member 41 is coupled to the sun gear s, a second coupling member 42 is coupled to the carrier ea, and a third coupling member 43 is coupled to the ring gear r. Each of the input member I, the output member O, the first rotating electrical machine MG1, and the second rotating electrical machine MG2 is drivingly coupled to one of the coupling members 41, 42, 43, and thus is drivingly coupled to a predetermined one of the rotating elements of the differential gear unit DG.

The input member I is drivingly coupled to the internal combustion engine E. In the present embodiment, the input member I is a shaft member (an input shaft). The internal combustion engine E is a motor that outputs power by fuel combustion. For example, a spark ignition engine such as a gasoline engine, a compression ignition engine such as a diesel engine, etc. may be used as the internal combustion engine E. The input member I is drivingly coupled to an internal combustion engine output shaft such as a crankshaft of the internal combustion engine E. In the present embodiment, the input member I is drivingly coupled to the internal combustion engine output shaft so as to rotate together therewith, and the rotational speed of the input member I is equal to that of the internal combustion engine E. The internal combustion engine E may be drivingly coupled to the input member I via other device such as a damper or a flywheel.

The output member O is drivingly coupled to the wheels W. In the present embodiment, the output member O is a gear member. Specifically, the output member O is a differential input gear included in an output differential gear unit D. In this example, the output differential gear unit D is formed by a differential gear mechanism using a plurality of bevel gears that mesh with each other, and is configured to distribute torque, which is transmitted to the output member O, to the right and left wheels W serving as drive wheels. Note that the wheels W of a vehicle on which the vehicle drive device 1 is mounted are provided with a brake device 8 (e.g., a disc brake) that operates according to a brake operation, and the vehicle is braked by a braking force of the brake device 8.

The first rotating electrical machine MG1 has a first stator St1 fixed to a case CS, and a first rotor Ro1 rotatably supported radially inside the first stator St1. The first rotor Ro1 is drivingly coupled to the first rotating electrical machine-coupled element Em (in this example, the sun gear s) via the first coupling member 41 serving as a first rotor shaft having the first rotor Ro1 fixed thereto, so as to rotate together with the first rotating electrical machine-coupled element Em. The second rotating electrical machine MG2 has a second stator St2 fixed to the case CS, and a second rotor Ro2 rotatably supported radially inside the second stator St2. The second rotor Ro2 is drivingly coupled to a second rotating electrical machine output gear 55 via a second rotor shaft having the second rotor Ro2 fixed thereto, so as to rotate together with the second rotating electrical machine output gear 55.

Figure 2:
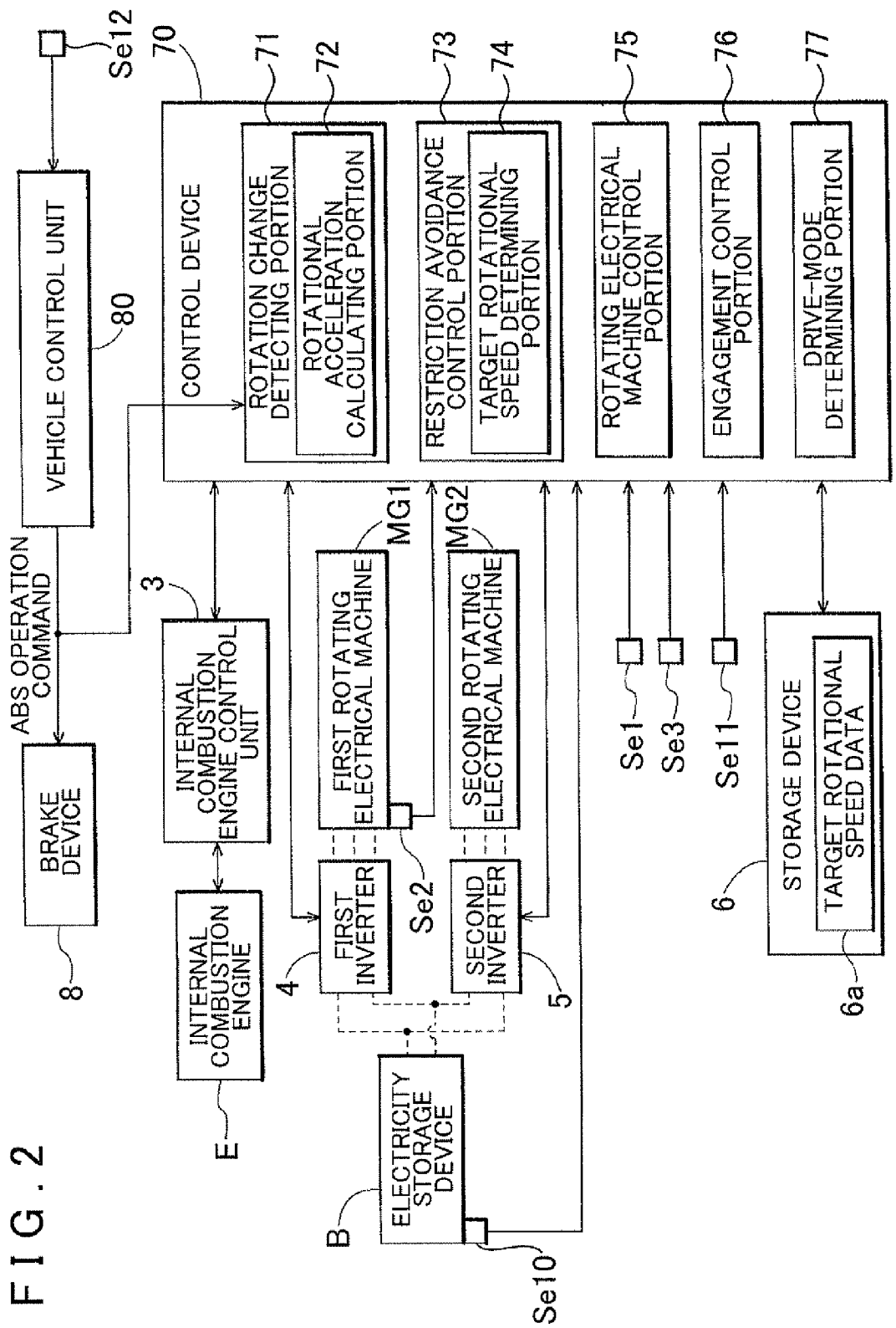
FIG. 2 is a schematic diagram showing a system configuration of the vehicle drive device.

As shown in FIG. 2, the first rotating electrical machine MG1 is electrically connected to an electricity storage device B via a first inverter 4, and the second rotating electrical machine MG2 is electrically connected to the electricity storage device B via a second inverter 5. A battery, a capacitor, etc. may be used as the electricity storage device B. In the present embodiment, each of the first rotating electrical machine MG1 and the second rotating electrical machine MG2 may function as a motor (an electric motor) that is supplied with electric power from the electricity storage device B to generate power (torque), and as a generator (an electric generator) that is supplied with power to generate electric power and to supply the generated electric power to the electricity storage device B.

The friction engagement device CL is provided so as to selectively establish driving coupling between the input member I and the second coupling member 42. That is, the friction engagement device CL is provided on a power transmission path between the input member I and the input rotating element Ei (in this example, the carrier ca) of the differential gear unit DG, and is capable of canceling driving coupling between the input member I and the input rotating element Ei. In other words, driving coupling between the input member I and the input rotating element Ei is selectively established via the friction engagement device CL. In the case where the friction engagement device CL is in a direct-coupling engaged state, the rotational speed of the second coupling member 42 that rotates together with the input rotating element Ei is equal to that of the input member I (the internal combustion engine E). In the case where the friction engagement device CL is in a disengaged state, the input rotating element Ei and the second coupling member 42 rotate relative to the input member I. Note that in the present embodiment, the friction engagement device CL is configured as a hydraulically operated wet multi-disc clutch.

The one-way clutch F is provided between the case CS and the second coupling member 42 so as to allow relative rotation between the input rotating element Ei (in this example, the carrier ca) and the case CS only in a positive direction. The case CS is a non-rotating element fixed to the body of the vehicle on which the vehicle drive device 1 is mounted, and the rotational speed of the case CS is always zero. Thus, in the present embodiment, the one-way clutch F is provided to allow the input rotating element Ei of the differential gear unit DG to rotate positively (to rotate in the positive direction), and to restrict negative rotation (rotation in a negative direction) of the input rotating element Ei of the differential gear unit DG. In the following description, the "negative-rotation restricting state" refers to the state in which the negative rotation of the input rotating element Ei is actually restricted, and the "relative rotation state" refers to the state in which rotation of the input rotating element Ei is not restricted and the input rotating element Ei is rotating in the positive direction. In the negative-rotation restricting state, the input rotating element Ei and the second coupling member 42, which rotate together, are held stationary with respect to the case CS, and the respective rotational speeds of the input rotating element Ei and the second coupling member 42 are zero.

The second rotating electrical machine MG2 and the output member O are drivingly coupled to the output rotating element Eo (in this example, the ring gear r) via a counter gear mechanism C. As shown in FIG. 1, the counter gear mechanism C is configured to have a first counter gear 53, a second counter gear 54, and a counter shaft that connects the first counter gear 53 and the second counter gear 54 so that the first counter gear 53 and the second counter gear 54 rotate together. The third coupling member 43 has a counter drive gear 52 that meshes with the first counter gear 53. The second rotating electrical machine output gear 55 is placed so as to mesh with the first counter gear 53 at a different direction in a circumferential direction (a circumferential direction of the first counter gear 53) from the counter drive gear 52, whereby the second rotating electrical machine MG2 is drivingly coupled to the output rotating element Eo. The output member O is placed so as to mesh with the second counter gear 54, and thus is drivingly coupled to the output rotating element Eo. That is, in the present embodiment, the respective rotational speeds of the output rotating element Eo, the second rotating electrical machine MG2, and the output member O are proportional to each other, and a proportionality coefficient (i.e., a rotational speed ratio) thereof has a value according to the number of teeth of a gear interposed therebetween.

With the above configuration, the vehicle drive device 1 is capable of executing a hybrid drive mode (a split drive mode) in which the vehicle is moved by the output torques of both the internal combustion engine E and the rotating electrical machines MG1, MG2, and an electric drive mode (including a first electric drive mode and a second electric drive mode, which will be described below) in which the vehicle is moved only by the output torques of the rotating electrical machines MG1, MG2. These drive modes will be described later.

2. System Configuration of Vehicle Drive Device 2-1. Overall Configuration of System The system configuration of the vehicle drive device 1 according to the present embodiment will be described. As shown in FIG. 2, the control device 70 according to the present embodiment includes a rotating electrical machine control portion 75, an engagement control portion 76, a drive-mode determining portion 77, a rotation change detecting portion 71, and a restriction avoidance control portion 73.

The control device 70 is configured to include, as a core member, an arithmetic processing unit such as a CPU and to have a storage device such as a RAM or a ROM. Each function unit of the control device 70 is formed by either software (a program) stored in the ROM etc. or separately provided hardware such as an arithmetic circuit, or by both the software and the hardware. These function units are configured to be able to transmit and receive information to and from each other.

The control device 70 is configured to be able to obtain information from sensors etc. provided in each part of the vehicle in order to obtain information on each part of the vehicle on which the vehicle drive device 1 is mounted. Specifically, as shown in FIG. 2, the control device 70 is configured to be able to obtain information from an input rotating element sensor Se1, a first rotor shaft sensor Se2, an output member sensor Se3, a state of charge sensor Se10, and an accelerator operation amount sensor Se11.

The input rotating element sensor Se1 is a sensor that detects the rotational speed of the input rotating element Ei of the differential gear unit DG. In this example, the rotational speed of the input rotating element Ei, which is detected by the input rotating element sensor Se1, is equal to that of the second coupling member 42. The first rotor shaft sensor Se2 is a sensor that detects the rotational speed of the first rotating electrical machine MG1 (the first rotor shaft). In this example, the rotational speed of the first rotating electrical machine MG1, which is detected by the first rotor shaft sensor Se2, is equal to that of the first coupling member 41 (the sun gear s). The first rotor shaft sensor Se2 can be, e.g., a rotation sensor (such as a resolver) included in the first rotating electrical machine MG1.

The output member sensor Se3 is a sensor that detects the rotational speed of the output member O. The control device 70 can derive the vehicle speed based on the rotational speed of the output member O, which is detected by the output member sensor Se3. The accelerator operation amount sensor Se11 is a sensor that detects the accelerator operation amount by detecting the operation amount of an accelerator pedal (not shown). The state of charge sensor Se10 is a sensor that detects the state (such as the amount of stored electricity) of the electricity storage device B. In the present embodiment, the state of charge sensor Se10 is formed by a voltage sensor, a current sensor, etc., and detects the amount of stored electricity by detecting the state of charge (SOC).

As shown in FIG. 2, the vehicle is provided with an internal combustion engine control unit 3 and a vehicle control unit 80. The internal combustion engine control unit 3 performs operation control of the internal combustion engine E by controlling each part of the internal combustion engine E. The internal combustion engine control unit 3 is capable of performing internal combustion engine start control in which the internal combustion engine E in a combustion stop state is changed to a start state, and internal combustion engine stop control in which the internal combustion engine E in the start state is changed to the combustion stop state, according to a command from the control device 70. The internal combustion engine start control and the internal combustion engine stop control are executed as appropriate when switching the drive mode.

The vehicle control unit 80 performs integrated control of the running state of the vehicle by controlling each part (e.g., a braking system including the brake device 8 etc., a steering system including a steering wheel, not shown, etc., accessories such as a compressor of an in-vehicle air conditioner and lights, etc.) of the vehicle other than a drive system. In particular, in the present embodiment, the vehicle control unit 80 includes an antilock brake system (ABS). The vehicle control unit 80 is configured to be able to obtain information from a wheel speed sensor Se12, and is configured to output an ABS operation command (a command to activate the antilock brake system) in response to detection of lockup of the wheels W. Thus, the braking force of the brake device 8 is controlled according to the ABS operation command so that the wheels W do not lock up.

2-2. Configuration of Rotating Electrical Machine Control Portion

The rotating electrical machine control portion 75 is a function unit that performs operation control of the first rotating electrical machine MG1 and the second rotating electrical machine MG2. Specifically, the rotating electrical machine control portion 75 sets a target torque and a target rotational speed as control targets of the output torque and the rotational speed of the first rotating electrical machine MG1, and controls the first inverter 4 so that the first rotating electrical machine MG1 operates according to the control targets. In this example, the rotating electrical machine control portion 75 performs operation control of the first rotating electrical machine MG1 by torque control or rotational speed control. The torque control refers to control in which a target torque is set for the first rotating electrical machine MG1 and the output torque of the first rotating electrical machine MG1 is controlled so as to become equal to the target torque. The rotational speed control refers to control in which a target rotational speed is set for the first rotating electrical machine MG1 and the rotational speed of the first rotating electrical machine MG1 is controlled so as to become equal to the target rotational speed. Control of the second rotating electrical machine MG2 is similar to that of the first rotating electrical machine MG1 except that the first inverter 4 is replaced with the second inverter 5.

2-3. Configuration of Engagement Control Portion

The engagement control portion 76 is a function unit that controls the state of the friction engagement device CL. In the present embodiment, the engagement control portion 76 controls the friction engagement device CL mainly to the direct-coupling engaged state or the disengaged state by controlling an oil pressure that is supplied to the friction engagement device CL. As used herein, the "direct-coupling engaged state" refers to the state in which the input member I and the second coupling member 42, which are located on both sides of the friction engagement device CL, are directly coupled to each other and rotate together. The "disengaged state" refers to the state in which neither rotation nor torque is transmitted between the input member I and the second coupling member 42, which are located on both sides of the friction engagement device CL. The engagement control portion 76 controls the state of the friction engagement device CL according to the drive mode that is determined by the drive-mode determining portion 77. For example, the engagement control portion 76 brings the friction engagement device CL to the direct-coupling engaged state when the hybrid drive mode is selected, and brings the friction engagement device CL to the disengaged state when the electric drive mode is selected. Note that during the transition between the hybrid drive mode and the electric drive mode, the engagement control portion 76 may control the state of the friction engagement device CL to a "slip engaged state" in which, with the input member I and the second coupling member 42 rotating relative to each other, torque is transmitted therebetween.

2-4. Configuration of Drive-Mode Determining Portion

The drive-mode determining portion 77 is a function unit that determines the drive mode of the vehicle. The drive-mode determining portion 77 determines the drive mode to be implemented by the vehicle drive device 1, based on, e.g., the vehicle speed derived according to the detection result of the output member sensor Se3, the accelerator operation amount detected by the accelerator operation amount sensor Se11, and the state of charge detected by the state of charge sensor Se10. In the present embodiment, the drive modes that can be determined by the drive-mode determining portion 77 include the hybrid drive mode and the electric drive mode. The electric drive mode includes the first electric drive mode and the second electric drive mode. Note that the drive-mode determining portion 77 determines the drive mode by referring to a mode selection map (not shown) that defines the relation among the vehicle speed, the accelerator operation amount, and the state of charge (the amount of stored electricity) and that is stored in advance in a storage device 6 formed by a memory etc.

The hybrid drive mode is a drive mode in which the vehicle runs by the output torque of both the internal combustion engine E and the rotating electrical machines MG1, MG2. The hybrid drive mode according to the present embodiment is the split drive mode, in which the friction engagement device CL is brought into the direct-coupling engaged state, and the output torque of the internal combustion engine E is distributed to the first rotating electrical machine MG1 when the output torque is transmitted via the input member I and the friction engagement device CL to the output member O. Note that in the hybrid drive mode, the one-way clutch F is in the relative rotation state. FIG. 3 is a speed diagram representing an operating state of the differential gear unit in the hybrid drive mode. Note that in each speed diagram that is referred to below, the ordinate corresponds to the rotational speed of each rotating element. That is, "0" shown on the ordinate means that the rotational speed is zero. The upper side of "0" corresponds to positive rotation (the rotational speed is positive), and the lower side of "0" corresponds to negative rotation (the rotational speed is negative). A plurality of parallel vertical lines respectively correspond to the rotating elements of the differential gear unit DG; and "Em," "Ei," and "Bo" shown in rectangular boxes at the top of each vertical line represent the first rotating electrical machine-coupled element Em, the input rotating element Ei, and the output rotating element Eo, respectively.

In each speed diagram, the respective rotational speeds of the first rotating electrical machine MG1, the second rotating electrical machine MG2, the internal combustion engine E (the input member I), and the output member O are shown by symbols different from each other. Note that in order to facilitate understanding of the invention, the respective rotational speeds of the second rotating electrical machine MG2 and the output member O are shown as the rotational speeds after shifting by a power transmission system located between each of the second rotating electrical machine MG2 and the output member O and the output rotating element Eo. Moreover, in each speed diagram, the state in which the one-way clutch F allows the input rotating element Ei (in this example, the carrier ca) to rotate only positively and restricts negative rotation of the input rotating element Ei is schematically represented by using a upward-pointing black triangle.

"T1" represents the output torque of the first rotating electrical machine MG1 which is transmitted to the first rotating electrical machine-coupled element Em (in this example, the sun gear s), and "T2" represents the output torque of the second rotating electrical machine MG2 which is transmitted to the output rotating element Eo (in this example, the ring gear r). "Te" represents the output torque of the internal combustion engine E which is transmitted to the input rotating element Ei via the friction engagement device CL in the direct-coupling engaged state, and "To" represents a running torque (running resistance) that is transmitted from the output member O (the wheels W) to the output rotating element Eo. An upward-pointing arrow shown next to the torque represents torque in the positive direction, and a downward-pointing arrow shown next to the torque represents torque in the negative direction.

As shown in the speed diagram of FIG. 3, in the hybrid drive mode, the output torque of the internal combustion engine E is transmitted to the input rotating element Ei, with the friction engagement device CL in the direct-coupling engaged state. At this time, the internal combustion engine E outputs torque in the positive direction according to a requested driving force for moving the vehicle, while being controlled to be maintained in a high efficiency, low exhaust gas state (a state conforming to optimal fuel consumption characteristics). This torque is transmitted to the input rotating element Ei via the input member I. In the differential gear unit DQ, the torque of the internal combustion engine E is input to the input rotating element Ei that is located at an intermediate position in the order of the rotational speed, and torque in the negative direction of the first rotating electrical machine MG1 is input to the first rotating electrical machine-coupled element Em that is located on one side with respect to the input rotating element Ei in the order of the rotational speed. The output member O is drivingly coupled to the output rotating element Eo that is located on the other side with respect to the input rotating element Ei in the order of the rotational speed. The first rotating electrical machine MG1 functions as an element that receives a reaction force of the torque of the internal combustion engine E. The differential gear unit DG distributes part of the torque of the internal combustion engine E transmitted to the input rotating element Ei to the first rotating electrical machine MG1 drivingly coupled to the first rotating electrical machine-coupled element Em, and transmits the torque decreased from the torque of the internal combustion engine E to the output member O drivingly coupled to the output rotating element Eo. The vehicle is moved in this manner.

At this time, the first rotating element MG1 generates electric power by basically rotating positively while outputting torque in the negative direction. The second rotating electrical machine MG2 outputs torque in the positive direction, as necessary, to supplement the torque that is transmitted to the output member O. Note that according to the vehicle speed, the first rotating electrical machine MG1 may perform power running by rotating negatively while generating torque in the negative direction, and the second rotating electrical machine MG2 may generate electric power for driving the first rotating electrical machine MG1. In the hybrid drive mode, the vehicle can run while efficiently driving the internal combustion engine E and generating electric power by using a large torque of the internal combustion engine E. Thus, according to the mode selection map the is referred to by the drive-mode determining portion 77, the hybrid drive mode is selected in, e.g., a low state of charge in which the amount of electricity stored in the electricity storage device 13 is equal to a predetermined value or less, etc.

The electric drive mode is a drive mode in which the vehicle runs only by the output torque of the rotating electrical machines MG1, MG2. In the electric drive mode, the friction engagement device CL is brought into the disengaged state, and with the internal combustion engine E in the combustion stop state, the output torque of one or both of the first rotating electrical machine MG1 and the second rotating electrical machine MG2 is transmitted to the output member O. In the present embodiment, the electric drive mode includes two modes, namely the first electric drive mode and the second electric drive mode.

The first electric drive mode is a drive mode in which the vehicle runs only by the output torque of the second rotating electrical machine MG2 with the friction engagement device CL in the disengaged state and with the one-way clutch F being in the relative rotation state. In this mode, the internal combustion engine E is brought into the combustion stop state. As shown in the speed diagram of FIG. 4, in the first electric drive mode, no torque is transmitted via the first rotating electrical machine-coupled element Em and the input rotating element Ei, and only the torque of the second rotating electrical machine MG2 drivingly coupled to the output rotating element Eo is transmitted to the output member O drivingly coupled to the output rotating element Eo. The second rotating electrical machine MG2 outputs torque according to a requested driving force to cause the vehicle to run. In the present embodiment, in the first electric drive mode, the rotational speed of the first rotating electrical machine MG1 is approximately zero, and idling of the first rotating electrical machine MG1 is avoided. According to the mode selection map, the first electric drive mode is selected in, e.g., a low load state in which the amount of electricity stored in the electricity storage device B is relatively large and the requested driving force is equal to or less than a predetermined value, etc.

Figure 5:
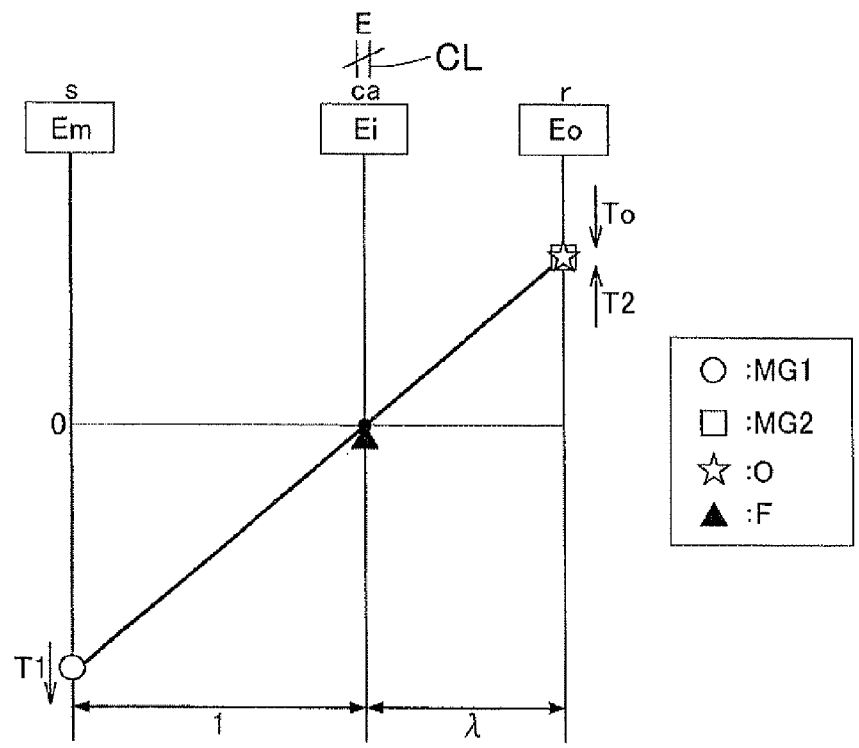
FIG. 5 is a speed diagram representing an operating state of the differential gear unit in a second electric drive mode.

The second electric drive mode is a drive mode in which the vehicle runs at least by the output torque of the first rotating electrical machine MG1 with the friction engagement device CL in the disengaged state and with the one-way clutch F being in the negative-rotation restricting state. In the present embodiment, in the second electric drive mode, the vehicle runs by the output torques of both the first rotating electrical machine MG1 and the second rotating electrical machine MG2. In this mode, the internal combustion engine E is brought into the combustion stop state. As shown in the speed diagram of FIG. 5, in the second electric drive mode, the torque of the second rotating electrical machine MG2 drivingly coupled to the output rotating element Eo is transmitted to the output member O drivingly coupled to the output rotating element Eo. The first rotating electrical machine MG1 rotates negatively while outputting torque in the negative direction, and the first rotating electrical machine-coupled element Em drivingly coupled to the first rotating electrical machine MG1 rotates negatively while the rotational speed of the first rotating electrical machine-coupled element Em decreases. With the decrease in rotational speed of the first rotating electrical machine-coupled element Em, the rotational speed of the input rotating element Em also decreases accordingly. When the rotational speed of the input rotating element Em reaches zero, the one-way clutch F is brought into the negative-rotation restricting state, and the input rotating element Ei is held stationary with respect to the case CS via the second coupling member 42.

The one-way clutch F in the negative-rotation restricting state functions as an element that receives a reaction force of the torque of the first rotating electrical machine MG1, and the torque in the negative direction of the first rotating electrical machine MG1, which is transmitted to the first rotating electrical machine-coupled element Em, is reversed in direction and transmitted to the output member O drivingly coupled to the output rotating element Eo. The first rotating electrical machine MG1 and the second rotating electrical machine MG2 operate together to output torque according to a requested driving force, thereby causing the vehicle to run. In the second electric drive mode, the torque of the first rotating electrical machine MG1 can also be used in addition to the torque of the second rotating electrical machine MG2, whereby a relatively large torque can be transmitted to the wheels W to cause the vehicle to run. According to the mode selection map, the second electric drive mode is selected in, e.g., a high load state in which the amount of electricity stored in the electricity storage device B is relatively large and the requested driving force is equal to or more than a predetermined value, etc.

Note that the present embodiment is advantageous in that bringing the one-way clutch F into the negative-rotation restricting state allows the input rotating element Ei to be held stationary with respect to the case CS and allows the torque of the first rotating electrical machine MG1 to be transmitted to the output member O, and the second electric drive mode can be implemented. Note that in the second electric drive mode, the friction engagement device CL may be brought into the direct-coupling engaged state.

Figure 6:
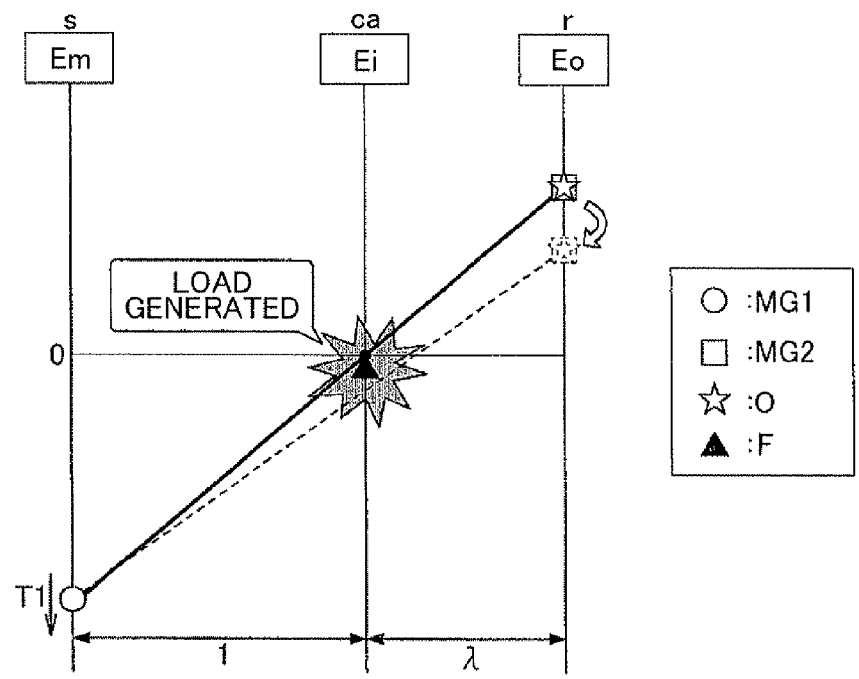
FIG. 6 is a speed diagram representing an operating state of the differential gear unit in the case where an output rotation abrupt change state occurs.

During running of the vehicle, the driver may perform a sudden brake operation in order to prevent an accident etc. If such a sudden operation is performed during, e.g., running in the second electric drive mode, the rotational speeds of the wheels W and the output member O and the rotational speed of the output rotating element Ea rotating at a rotational speed proportional to the rotational speeds of the wheels W and the output member O significantly decrease in a short time due to a large braking force of the brake device 8, as shown in FIG. 6. Note that in the present embodiment, in this case, an ABS operation command is output from the vehicle control unit 80 to activate the antilock brake system.

At this time, if there is no one-way clutch F, the rotational speeds of the output rotating element Eo and the input rotating element Ei are about to decrease rapidly with the first rotating electrical machine-coupled element Em as a fulcrum point to which the first rotating electrical machine MG1 is drivingly coupled, due to the moment of inertia of the first rotating electrical machine MG1, as shown by broken line in FIG. 6. As a result, the one-way clutch F in the negative-rotation restricting state in the second electric drive mode is further subjected to torque in the negative direction, and thus is momentarily subjected to a large load. In order to reduce occurrence of such a problem, the control device 70 according to the present embodiment includes the rotation change detecting portion 71 and the restriction avoidance control portion 73. Note that it is assumed in the following description that the vehicle is running in the second electric drive mode.

2-5. Configuration of Rotation Change Detecting Portion

The rotation change detecting portion 71 is a function unit that detects an output rotation abrupt change state, namely a state in which the rotational speed of the output member O changes abruptly. The rotation change detecting portion 71 detects the output rotation abrupt change state based on one or both of rotational acceleration of the output member O and the ABS operation command from the vehicle control unit 80. In the present embodiment, the rotation change detecting portion 71 is configured to detect the output rotation abrupt change state based on both the rotational acceleration of the output member O and the ABS operation command.

As shown in FIG. 2, the rotation change detecting portion 71 includes a rotational acceleration calculating portion 72 in order to obtain information on the rotational acceleration of the output member O. The rotational acceleration calculating portion 72 successively obtains information on the rotational acceleration of the output member O detected by the output member sensor Se3 in a predetermined cycle, and calculates the rotational acceleration of the output member O based on the obtained information. The rotational acceleration of the output member O is the amount of change in rotational speed of the output member O per unit time (the rate of change over time). The rotational acceleration calculating portion 72 calculates the rotational acceleration of the output member O by calculating the amount of change in rotational speed of the output member O before and after the period corresponding to N cycles (where N is an integer of 1 or more), and dividing the calculated amount of change by the time corresponding to the N cycles.

The rotation change detecting portion 71 detects the output rotation abrupt change state based at least on the information on the rotational acceleration calculated by the rotational acceleration calculating portion 72. In the present embodiment, the rotation change detecting portion 71 detects the output rotation abrupt change state on the condition that it has been detected that the rotational acceleration of the output member O is equal to or higher than a predetermined abrupt change threshold value At in the negative direction. As used herein, the expression "the rotational acceleration is equal to or higher than the abrupt change threshold value At in the negative direction" means that, regarding the relation between the rotational acceleration and the abrupt change threshold value At both having a negative value, the absolute value of the rotational acceleration is equal to or larger than the absolute value of the abrupt change threshold value At. In other words, the rotation change detecting portion 71 detects the output rotation abrupt change state on the condition that it has been detected that the rotational acceleration of the output member O is equal to or lower than the abrupt change threshold value At (see FIG. 8) that is set to a negative value.

In the present embodiment, the abrupt change threshold value At, which is used as a reference to detect the output rotation abrupt change state by the rotation change detecting portion 71, is set based on the rotational acceleration of the output member O according to negative acceleration of the vehicle during braking of the vehicle. As used herein, the term "negative acceleration of the vehicle" refers to the negative acceleration (vehicle body acceleration <0) of the vehicle body itself associated with braking of the vehicle. The expression "rotational acceleration of the output member O according to the negative acceleration of the vehicle" refers to the rotational acceleration of the output member O when the vehicle body is decelerated without lockup of the wheels W (with the tires maintaining their gripping force) during braking of the vehicle, and the rotational acceleration of the output member O is proportional to the vehicle body acceleration. Moreover, in this example, the abrupt change threshold value At is set to a value that is larger in the negative direction than the rotational acceleration of the output member O according to the vehicle body acceleration in the case where the vehicle is braked with a relatively large braking force close to a braking force that is applied immediately before the wheels W lock up and the tires lose their gripping force (this rotational acceleration of the output member O is herein referred to as the "maximum grip rotational acceleration"). That is, the abrupt change threshold value At is set to a value lower than the maximum grip rotational acceleration having a negative value, and the absolute value of the abrupt change threshold value At is larger than the absolute value of the maximum grip rotational acceleration.

Thus, the rotation change detecting portion 71 detects the output rotation abrupt change state basically by detecting that the rotational acceleration of the output member O is equal to or lower than the abrupt change threshold value At. In the present embodiment, the rotation change detecting portion 71 also detects the output rotation abrupt change state based on the ABS operation command issued from the vehicle control unit 80 by detecting output of the ABS operation command. That is, the rotation change detecting portion 71 detects the output rotation abrupt change state by detecting either the rotational acceleration of the output member O becoming equal to or lower than the abrupt change threshold value At or output of the ABS operation command, whichever happens earlier. When the rotation change detecting portion 71 detects the output rotation abrupt change state, the rotation change detecting portion 71 outputs information on the detection result to the restriction avoidance control portion 73.

Figure 8:
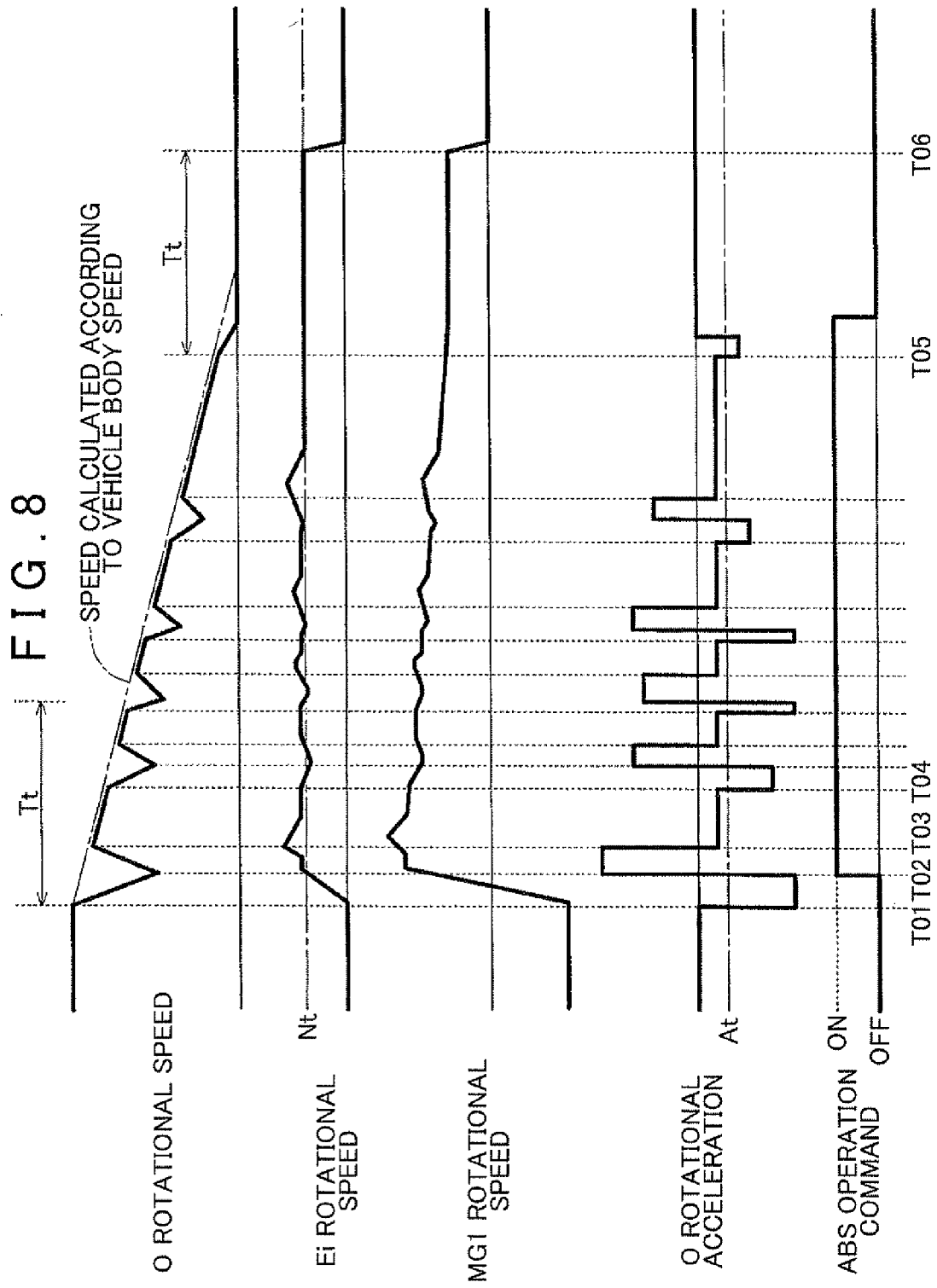
FIG. 8 is a timing chart showing an example of an operating state of each part during execution of the restriction avoidance control.

Note that when the antilock brake system is operated, there may be a case where the wheels W are alternately and repeatedly switched between a lockup state and a non-lockup state, and the rotational acceleration of the output member O is alternately and repeatedly switched between the state in which the rotational acceleration of the output member O is equal to or lower than the abrupt change threshold value At and the state in which the rotational acceleration of the output member O is higher than the abrupt change threshold value At (see FIG. 8). In this case, the output rotation abrupt change state is detected only once based on the ABS operation command, while the output rotation abrupt change state is detected a plurality of times based on the rotational acceleration of the output member O. In the present embodiment, after detecting the first output rotation abrupt change state in a series of vehicle braking operations, the rotation change detecting portion 71 outputs information on the detection result to the restriction avoidance control portion 73 every time the rotation change detecting portion 71 detects the output rotation abrupt change state based on the rotational acceleration of the output member O.

2-6. Configuration of Restriction Avoidance Control Portion

The restriction avoidance control portion 73 is a function unit that executes restriction avoidance control in the case where the output rotation abrupt change state is detected by the rotation change detecting portion 71 during running of the vehicle in a low rotation state in which the rotational speed of the input rotating element Ei is lower than a predetermined control threshold value Nt (see FIGS. 7 and 8) that is set to a value larger than zero. The restriction avoidance control is control in which the rotational speed of the first rotating electrical machine MG1 is controlled so that the rotational speed of the input rotating element Ei becomes equal to or higher than the control threshold value Nt. That is, the restriction avoidance control is control in which the rotational speed of the first rotating electrical machine MG1 is controlled to increase the rotational speed of the input rotating element Ei rotating at a rotational speed lower than the control threshold value Nt to a rotational speed equal to or higher than the control threshold value Nt.

In the present embodiment, the control threshold value Nt, which is used as a reference to determine whether the low rotation state has been established or not, which is one of initiation conditions for executing the restriction avoidance control, is set in view of a variation in rotational speed of the input rotating element Ei in the negative direction in the output rotation abrupt change state. More specifically, a predicted variation $\Delta N$ in rotational speed of the input rotating element E in the negative direction is calculated in advance based on a predicted amount of change in rotational speed of the output member O that is expected when the output rotation abrupt change state occurs, and also in view of the speed ratio $\rho$ from the output member O to the output rotating element Eo by the power transmission system, and the gear ratio $\lambda$ of the differential gear unit DG (see FIGS. 3 to 7). Note that the gear ratio $\lambda$ of the differential gear unit DG is the ratio of the number of teeth of the sun gear s to the number of teeth of the ring gear r. The speed ratio $\rho$ from the output member O to the output rotating element Eo by the power transmission system is determined based on the respective numbers of teeth of the counter drive gear 52, the first counter gear 53, the second counter gear 54, and the output member O as a differential input gear. In the present embodiment, the control threshold value Nt is set by adding a predetermined margin to the predicted variation $\Delta N$. That is, the control threshold value Nt is set to a value that is larger than the predicted variation $\Delta N$ by a predetermined amount.

In the present embodiment, during, e.g., running in the second electric drive mode, the one-way clutch F is in the negative-rotation restricting state, and the rotational speed of the input rotating element Ei is zero. Thus, the rotational speed of the input rotating element Ei is always lower than the control threshold value Nt and the low rotation state is always established during running in the second electric drive mode. The restriction avoidance control is started if the restriction avoidance control portion 73 receives information on the detection result of the output rotation abrupt change state from the rotation change detecting portion 71 in this state.

In the restriction avoidance control, a target rotational speed of the first rotating electrical machine MG1 is set, and the rotational speed of the first rotating electrical machine MG1 is controlled by using the target rotational speed as a target value. As shown in FIG. 2, the restriction avoidance control portion 73 includes a target rotational speed determining portion 74 in order to set the target rotational speed of the first rotating electrical machine MG1 during the restriction avoidance control. In the present embodiment, the target rotational speed determining portion 74 determines the target rotational speed of the first rotating electrical machine MG1 by referring to target rotational speed data 6a stored in advance in the storage device 6.

The target rotational speed data 6a is data that defines the relation between the rotational speed of the output member O and the target rotational speed of the first rotating electrical machine MG1 for making the rotational speed of the input rotating element Ei equal to or higher than the control threshold value Nt. If the gear ratio λ of the differential gear unit DG and the speed ratio ρ from the output member O to the output rotating element Eo by the power transmission system are known, the relation is determined between the rotational speed of the output member O and the rotational speed of the first rotating electrical machine MG1 in the state in which the rotational speed of the input rotating element Ei is equal to the control threshold value Nt. That is, the rotational speed of the first rotating electrical machine MG1 according to the rotational speed of the output member O is determined. In the target rotational speed data 6a of the present embodiment, the target rotational speed equal to or higher than the rotational speed of the first rotating electrical machine MG1 determined as described above is associated with every rotational speed of the output member O. Thus, the target rotational speed of the first rotating electrical machine MG1, which is set based on the rotational speed of the output member O, the speed ratio ρ from the output member O to the output rotating element Eo by the power transmission system, the gear ratio λ of the differential gear unit DG, and the control threshold value Nt is included in the target rotational speed data 6a. Such target rotational speed data 6a is provided in the fowl of a two-dimensional map, a table, etc.

The target rotational speed determining portion 74 determines the target rotational speed of the first rotating electrical machine MG1 based on the target rotational speed data 6a and the rotational speed of the output member O. That is, the target rotational speed determining portion 74 obtains the rotational speed (an actual rotational speed) of the output member O actually detected by the output member sensor Se3 and refers to the target rotational speed data 6a, and obtains the target rotational speed of the first rotating electrical machine MG1 by reading the target rotational speed of the first rotating electrical machine MG1 associated with the actual rotational speed of the output member O in the target rotational speed data 6a. The target rotational speed determining portion 74 determines that the target rotational speed thus obtained is the target rotational speed of the first rotating electrical machine MG1 in the restriction avoidance control.

Note that during the restriction avoidance control, the rotational speed of the output member O successively changes in a predetermined manner with time by braking of the vehicle (see FIG. 8). Thus, the target rotational speed of the first rotating electrical machine MG1 is also successively corrected accordingly.

Figure 7:
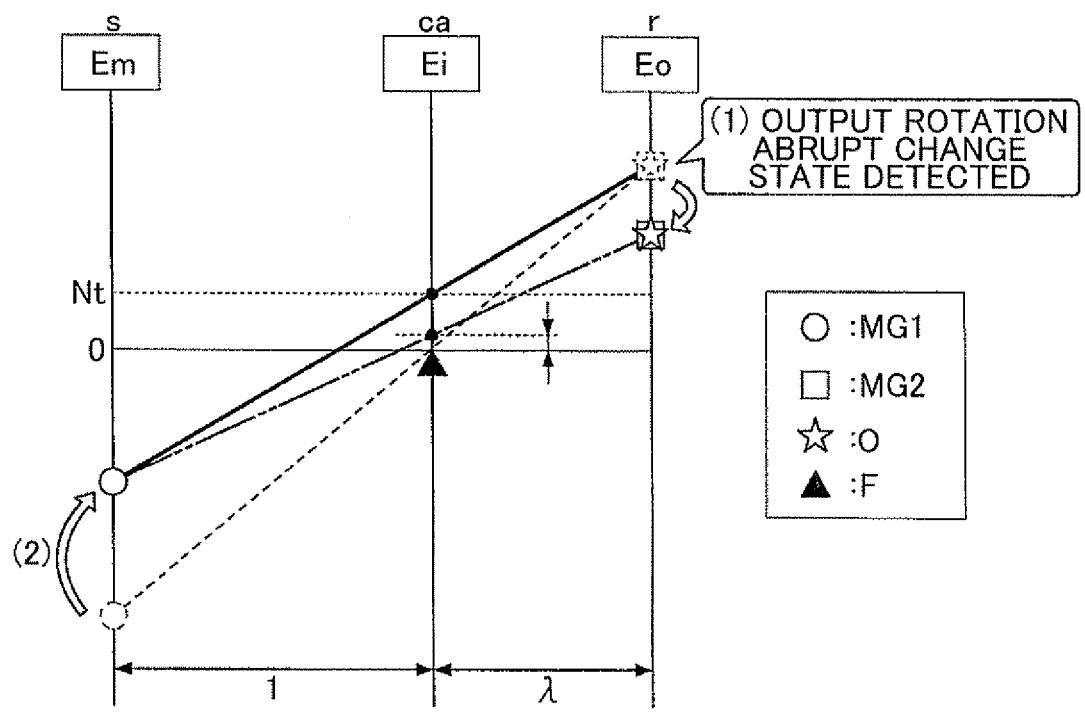
FIG. 7 is a speed diagram illustrating operation of restriction avoidance control.

The restriction avoidance control portion 73 controls the rotational speed of the first rotating electrical machine MG1 so that the rotational speed of the first rotating electrical machine MG1 becomes equal to the determined target rotational speed. In the present embodiment, the target rotational speed determining portion 74 outputs the determined target rotational speed to the rotating electrical machine control portion 75, and the rotating electrical machine control portion 75 controls the rotational speed of the first rotating electrical machine MG1 by using the received target rotational speed as a target value. That is, the restriction avoidance control portion 73 operates together with the rotating electrical machine control portion 75 to control the rotational speed of the first rotating electrical machine MG1 so that the rotational speed of the first rotating electrical machine MG1 becomes equal to the target rotational speed determined by the target rotational speed determining portion 74. Thus, the restriction avoidance control portion 73 executes rotational speed control of the first rotating electrical machine MG1 to increase the rotational speed thereof, and as shown in FIG. 7, increases the rotational speed of the input rotating element Ei rotating at a rotational speed (in this example, the rotational speed is zero) lower than the control threshold value Nt to a rotational speed equal to or higher than the control threshold value Nt. This brings the one-way clutch F into the relative rotation state in which the second coupling member 42 rotates at a rotational speed equal to or higher than the control threshold value Nt.

Note that in FIG. 7, broken line represents a speed diagram of the differential gear unit DG immediately before the output rotation abrupt change state is detected by the rotation change detecting portion 71. In order to facilitate understanding of the invention, solid line represents a speed diagram of the differential gear unit DG in the case where it is assumed that occurrence of the output rotation abrupt change state is detected before the rotational speed of the output member O actually decreases significantly, and the rotational speed of the first rotating electrical machine MG1 is immediately made equal to the target rotational speed by executing the restriction avoidance control.

As can be well understood from the speed diagram shown by the solid line in FIG. 7, the rotational speed of the input rotating element Ei is made equal to or higher than the control threshold value Nt by executing the restriction avoidance control. Especially in the present embodiment, in the second electric drive mode, the friction engagement device CL is brought into the disengaged state, and the input rotating element Ei is separated from the input member I and the internal combustion engine E. Thus, the rotational speed of the first rotating electrical machine MG1 can be increased in the state in which there is no load due to friction resistance inside the internal combustion engine E etc. Thus, the state in which the rotational speed of the input rotating element Ei is equal to or higher than the control threshold value Nt can be implemented early.

If the rotational speed of the output member O actually decreases significantly and the rotational speed of the output rotating element Eo also decreases significantly in this state, the rotational speed of the input rotating element Ei decreases with the first rotating electrical machine-coupled element Em as a fulcrum point whose rotational speed is maintained at a substantially constant value due to inertia, as also shown in the speed diagram shown by two-dot chain line in FIG. 7. However, the amount of decrease is less than the control threshold value Nt, and the one-way clutch F is maintained in the relative rotation state. Thus, even if the rotational speed of the output member O decreases rapidly due to a sudden braking operation etc., the possibility can be reduced that the one-way clutch F may be brought into the negative-rotation restricting state and the input rotating element Ei may further be subjected to a load (a one-way torque). Thus, occurrence of failure of the one-way clutch F can be effectively suppressed.

Since occurrence of failure of the one-way clutch F can be suppressed by executing the restriction avoidance control as described above, it is not necessary to design the one-way clutch F itself with high strength, and to provide a separate impact absorption mechanism such as a damper or a torque limiter. This can suppress an increase in manufacturing cost of the vehicle drive device 1 and an increase in weight thereof.

The restriction avoidance control portion 73 determines that the restriction avoidance control should be terminated, based on a preset predetermined termination determination time Tt (see FIG. 8). In the present embodiment, the restriction avoidance control portion 73 determines that the restriction avoidance control should be terminated, if the rotation change detecting portion 71 does not additionally detect the output rotation abrupt change state before the predetermined termination determination time Tt elapses after detection of the output rotation abrupt change state. Specifically, upon receiving information on the detection result of the output rotation abrupt change state from the rotation change detecting portion 71, the restriction avoidance control portion 73 measures an elapsed time from the reception of the information by using a timer etc. Thereafter, if the restriction avoidance control portion 73 additionally receives information on the detection result of the output rotation abrupt change state from the rotation change detecting portion 71 before the termination determination time Tt elapses, the restriction avoidance control portion 73 resets the measured elapsed time, and measures an elapsed time from the reception of the information. If the restriction avoidance control portion 73 does not additionally receive information on the detection result of the output rotation abrupt change state from the rotation change detecting portion 71 before the termination determination time Tt elapses, the restriction avoidance control portion 73 determines that the restriction avoidance control should be terminated. After the restriction avoidance control is terminated, the rotating electrical machine control portion 75 controls the first rotating electrical machine MG1 and the second rotating electrical machine MG2 according to the normal control targets in the second electric drive mode.

Figure 9:
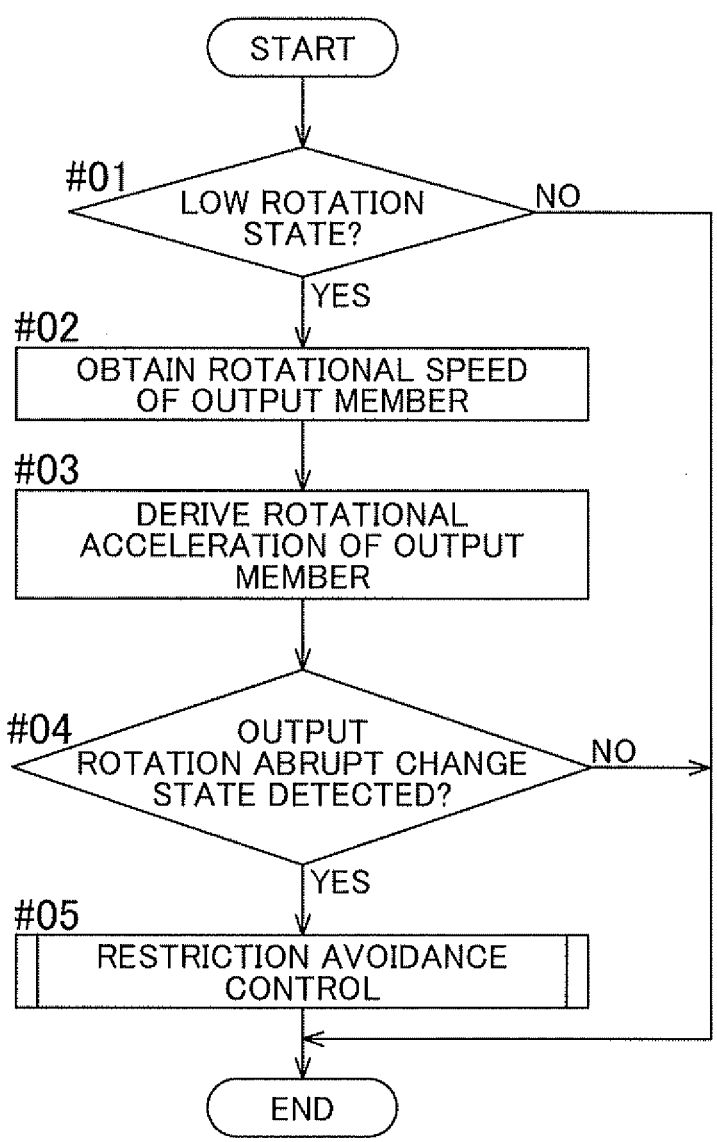
FIG. 9 is a flowchart showing the overall processing procedure of specific running control including the restriction avoidance control.
Figure 10:
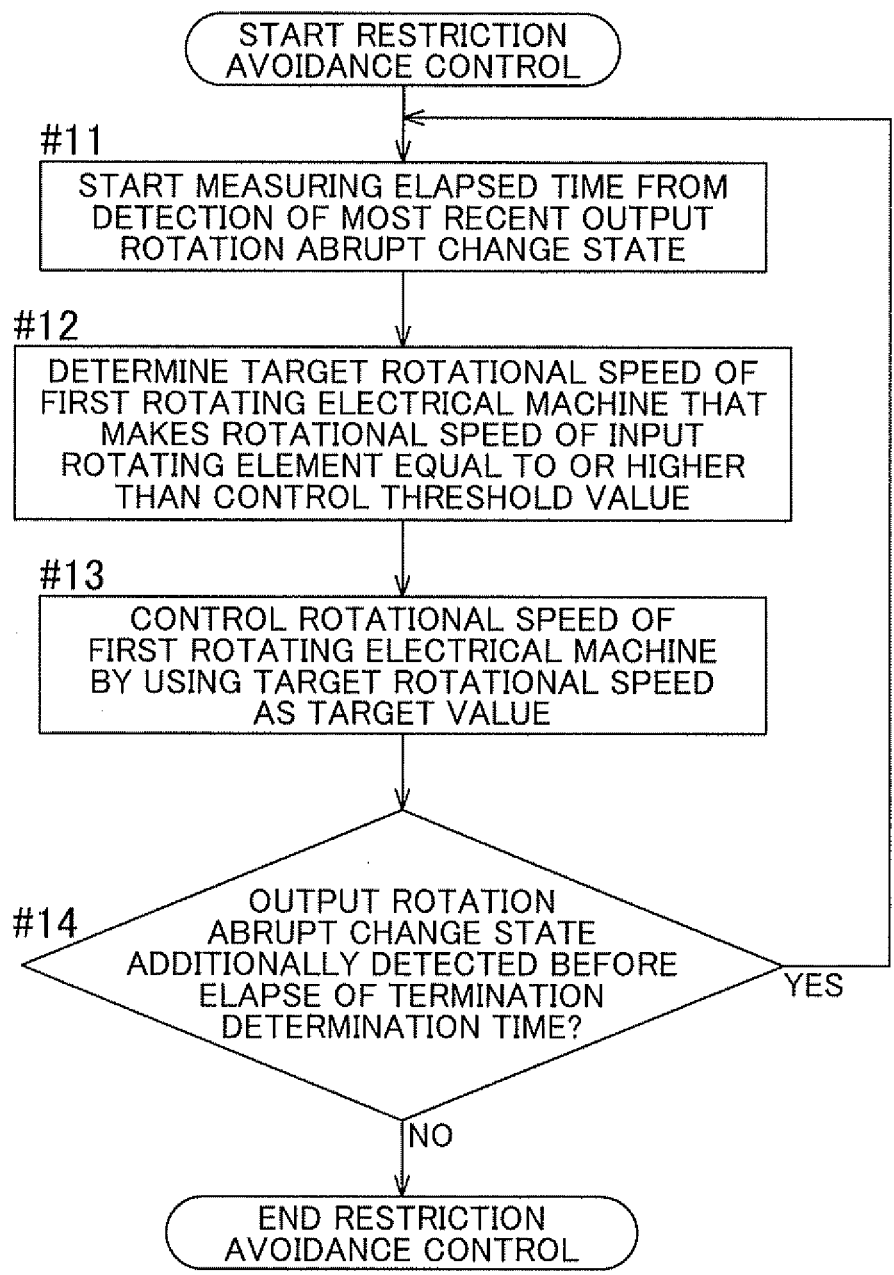
FIG. 10 is a flowchart showing the processing procedure of the restriction avoidance control.

3. Specific Contents and Processing Procedures of Specific Running Control Including Restriction Avoidance Control Specific contents and processing procedures of specific running control including the restriction avoidance control according to the present embodiment will be described below with reference to the timing chart of FIG. 8 and the flowcharts of FIGS. 9 and 10. Note that as described above as one specific example, it is assumed in FIG. 8 that the antilock brake system is activated during running in the second electric drive mode. FIG. 9 is a flowchart illustrating the overall processing procedures of the specific running control, and FIG. 10 is a flowchart illustrating the processing procedures of the restriction avoidance control in step #05.

As shown in FIG. 8, the vehicle is first running in the second electric drive mode with both the torque of the first rotating electrical machine MG1 and the torque of the second rotating electrical machine MG2 transmitted to the output member O. In this state, the restriction avoidance control portion 73 determines whether the low rotation state has been established in which the rotational speed of the input rotating element Ei is lower than the predetermined control threshold value Nt (step #01). In this example, since the one-way clutch F is in the negative-rotation restricting state and the rotational speed of the input rotating element Ei is zero in the second electric drive mode, the restriction avoidance control portion 73 determines that the low rotation state has been established (step #01: Yes), and the rotational acceleration calculating portion 72 obtains information on the rotational speed of the output member O from the output member sensor Se3 (step #02). The rotational acceleration calculating portion 72 successively obtains information on the rotational speed of the output member O in a predetermined cycle to calculate rotational acceleration of the output member O (step #03).

The rotation change detecting portion 71 receives information on the rotational acceleration of the output member O, and compares the received rotational acceleration with the predetermined abrupt change threshold value At for their magnitude relation to determine whether the output rotation abrupt change state has been established or not. At this time, the rotation change detecting portion 71 determines whether the output rotation abrupt change state has been established or not, based also on the ABS operation command from the vehicle control unit 80 (step #04). If the output rotation abrupt change state is not detected (step #04: No), the specific running control is terminated. On the other hand, if it is detected at time T01 in FIG. 8 that the rotational speed of the output member O has decreased rapidly due to, e.g., lockup of the wheels W etc. and the rotational acceleration has become lower than the abrupt change threshold value At (the absolute value of the rotational acceleration of the output member O has become larger than the absolute value of the abrupt change threshold value At), and thus the output rotation abrupt change state is detected (step #04: Yes), the restriction avoidance control is executed (step #05). Note that as can be well understood from FIG. 8, in the output rotation abrupt change state, the actual rotational speed of the output member O is significantly different from the speed calculated according to the running speed (the vehicle body speed) of the vehicle body itself.

In the restriction avoidance control, the restriction avoidance control portion 73 starts measuring an elapsed time from time T01 when the most recent output rotation abrupt change state was detected (step #11). The target rotational speed determining portion 74 obtains information on the rotational speed of the output member O, and determines the target rotational speed of the first rotating electrical machine MG1, based on the obtained information and the target rotational speed data 6a stored in the storage device 6 (step #12). The restriction avoidance control portion 73 operates together with the rotating electrical machine control portion 75 to control the rotational speed of the first rotating electrical machine MG1 so that the rotational speed of the first rotating electrical machine MG1 becomes equal to the determined target rotational speed (step #13). Thus, at time T02, the rotational speed of the input rotating element Ei is equal to or higher than the control threshold value Nt. Note that in this example, the ABS operation command is output at time T02 after the lockup of the wheels W is detected. However, the rotation change detecting portion 71 does not refer to this ABS operation command because the output rotation abrupt change state was already detected at time T01.

From time T02 on, the wheels W are released from the lockup state due to operation of the antilock brake system, and the rotational speed of the output member O increases toward the speed calculated according to the vehicle body speed. From time T03 on when the rotational speed of the output member O becomes equal to the calculated speed, the rotational speed of the output member O decreases while maintaining the state in which the rotational speed of the output member O is equal to the calculated speed. Note that at this time, the rotational acceleration of the output member O is higher than the abrupt change threshold value At (the absolute value of the rotational acceleration of the output member O is smaller than the absolute value of the abrupt change threshold value At). The restriction avoidance control portion 73 monitors whether or not the output rotation abrupt change state is additionally detected by the rotation change detecting portion 71 before the termination determination time Tt elapses from time T01 (step #14). In the example of FIG. 8, during operation of the antilock brake system, the wheels W lock up again at time T04 before the termination determination time Tt elapses from time T01, and the output rotation abrupt change state is detected again based on the rotational acceleration of the output member O (step #14: Yes).

In this case, the restriction avoidance control portion 73 resets the measured elapsed time, and starts measuring an elapsed time from time T04 when the most recent output rotation abrupt change state was detected (step #11). From time T04 on, the processing from step #11 to step #14 is repeatedly performed. In this example, this processing is repeated four times during the period from time T04 to time T05. Note that operation of each part of the vehicle in each repetition unit is similar to the operation during the period from time T01 to time T04.

Moreover, in this example, the termination determination time Tt elapses at time T06 with no output rotation abrupt change state being additionally detected by the rotation change detecting portion 71 from time T05 on when the sixth output rotation abrupt change state was detected (step #14: No). Thus, the restriction avoidance control portion 73 determines to terminate the restriction avoidance control, and terminates the restriction avoidance control. Then, the specific running control is terminated. Note that the above specific running control is successively repeatedly performed during running of the vehicle.

4. Other Embodiments

Lastly, other embodiments of the vehicle drive device of the present invention will be described below. Note that the configuration disclosed in each of the following embodiments may be applied in combination with the configurations disclosed in the other embodiments as long as no inconsistency arises.

Figure 11:
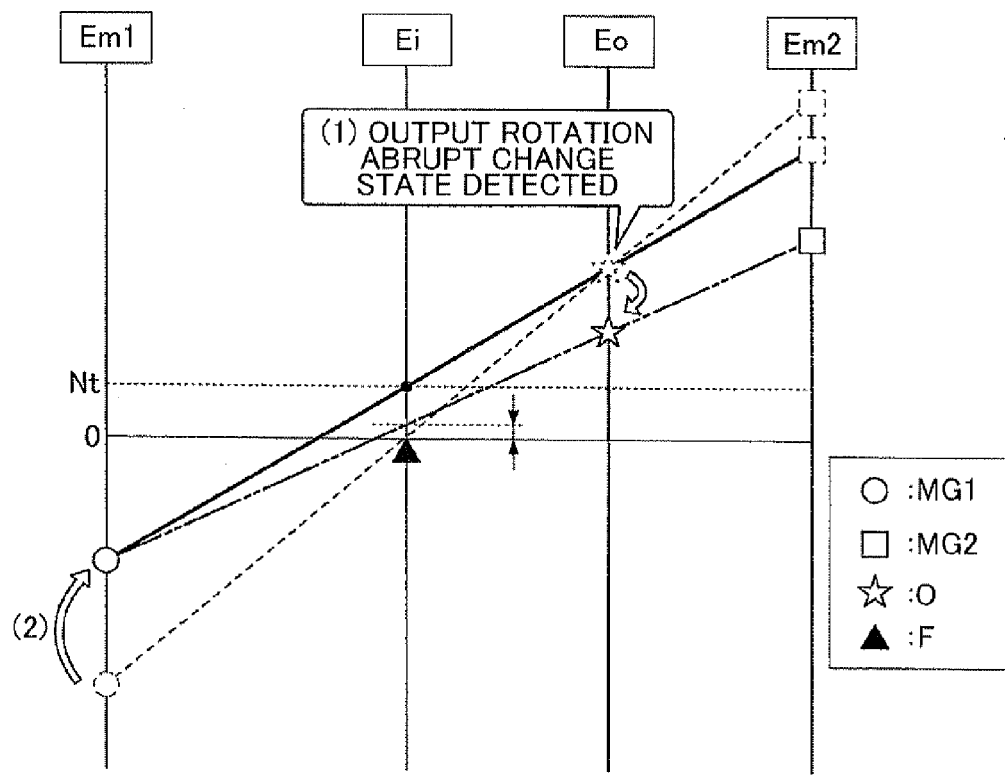
FIG. 11 is a speed diagram illustrating operation of restriction avoidance control according to another embodiment.

(1) The above embodiment is described with respect to an example in which the differential gear unit DG has only three rotating elements, and the second rotating electrical machine MG2 is drivingly coupled to the output rotating element Eo of the differential gear unit DG. However, embodiments of the present invention are not limited to this. That is, it is also one of preferred embodiments of the present invention that the differential gear unit DG have four or more rotating elements. As shown in, e.g., FIG. 11, the differential gear unit DG may be configured to have four rotating elements. In the example of FIG. 11, the second rotating electrical machine MG2 is drivingly coupled to a second rotating electrical machine-coupled element Em2, which is the rotating element other than the input rotating element Ei, a first rotating electrical machine-coupled element Em1 (the same as "Em" in the above embodiment), and the output rotating element Eo among the four rotating elements of the differential gear unit DG. Like the above embodiment, this configuration can also effectively suppress occurrence of failure of the one-way clutch F by executing the restriction avoidance control when the output rotation abrupt change state is detected in a low vehicle speed state.

Note that in the example of FIG. 11, the rotational speeds of the four rotating elements of the differential gear unit DG are in the order of the first rotating electrical machine-coupled element Em1, the input rotating element Ei, the output rotating element Eo, and the second rotating electrical machine-coupled element Em2. However, it is preferable if the rotational speeds of at least the first rotating electrical machine-coupled element Em1, the input rotating element Ei, and the output rotating element Eo of the four rotating elements are in the above order, and the rotational speed of the second rotating electrical machine-coupled element Em2 may be located at any position. That is, the rotational speeds of the four rotating elements of the differential gear unit DG may alternatively be in the order of (Em1, Ei, Em2, Eo), (Em1, Em2, Ei, Eo), or (Em2, Em1, Ei, Eo).

Figure 12:
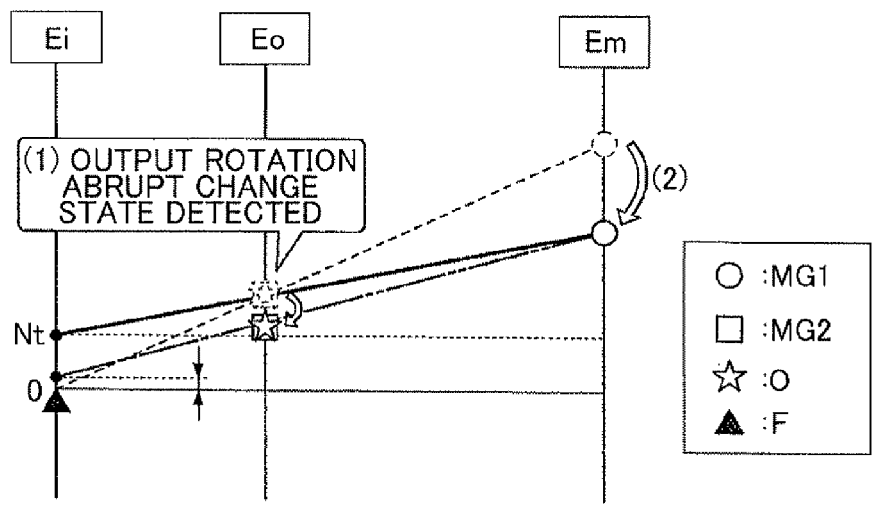
FIG. 12 is a speed diagram illustrating operation of restriction avoidance control according to still another embodiment.

(2) The above embodiment is described with respect to an example in which the rotational speeds of the three rotating elements of the differential gear unit DG are in the order of the first rotating electrical machine-coupled element Em, the input rotating element Ei, and the output rotating element Eo. However, embodiments of the present invention are not limited to this. That is, as shown in FIG. 12, it is also one of preferred embodiments of the present invention that the rotational speeds of these elements be in the order of the first rotating electrical machine-coupled element Em, the output rotating element Eo, and the input rotating element Ei. In this case, unlike the above embodiment, the hybrid drive mode in which the vehicle runs by the output torques of both the internal combustion engine E and the rotating electrical machines MG1, MG2 is basically a torque converter mode in which torque amplified with respect to the output torque of the internal combustion engine E is transmitted to the output member O. Like the above embodiment, this configuration can also effectively suppress occurrence of failure of the one-way clutch F by executing the restriction avoidance control when the output rotation abrupt change state is detected in the low vehicle speed state.

Note that in the example of FIG. 12, the differential gear unit DG has only three rotating elements, and the second rotating electrical machine MG2 is drivingly coupled to the output rotating element Eo of the differential gear unit DG. However, the differential gear unit DG may be configured to have four or more rotating elements in the configuration including the torque converter mode as the hybrid drive mode. In this case, the rotational speeds of the four rotating elements of the differential gear unit DG can be in the order of (Em1, Em2, Eo, Ei) or (Em2, Em1, Eo, Ei), where the first rotating electrical machine-coupled element Em1 is the rotating element to which the first rotating electrical machine MG1 is drivingly coupled, and the second rotating electrical machine-coupled element Em2 is the rotating element to which the second rotating electrical machine MG2 is drivingly coupled.

(3) The above embodiment is described with respect to an example in which the friction engagement device CL capable of canceling driving coupling between the input member I and the input rotating element Ei is provided. However, embodiments of the present invention are not limited to this. That is, it is also one of preferred embodiments of the present invention that no such friction engagement device CL be provided and that the input member I be drivingly coupled to the input rotating element Ei so as to always rotate together therewith.

(4) The above embodiment is described with respect to an example in which the rotation change detecting portion 71 detects the output rotation abrupt change state based on both the rotational acceleration of the output member O and the ABS operation command from the vehicle control unit 80. Specifically, the above embodiment is described with respect to an example in which the rotation change detecting portion 71 detects the output rotation abrupt change state by detecting either the rotational acceleration of the output member O becoming equal to or lower than the abrupt change threshold value At or output of the ABS operation command, whichever happens earlier. However, embodiments of the present invention are not limited to this. That is, for example, it is also one of preferred embodiments of the present invention that the rotation change detecting portion 71 be configured to detect the output rotation abrupt change state by detecting both the rotational acceleration of the output member O becoming equal to or lower than the abrupt change threshold value At and output of the ABS operation command. It is also one of the preferred embodiments of the present invention that the rotation change detecting portion 71 be configured to detect the output rotation abrupt change state based only on the rotational acceleration of the output member O without taking the ABS operation command into consideration, or to detect the output rotation abrupt change state based only on the ABS operation command from the vehicle control unit 80 without taking the rotational acceleration of the output member O into consideration.

(5) The above embodiment is described with respect to an example in which the restriction avoidance control is executed in a situation where the antilock brake system is activated during running in the second electric drive mode. However, situations where the present invention is applied are not limited to this. That is, for example, the restriction avoidance control may be executed when the output rotation abrupt change state is detected in the low vehicle speed state in a situation where during running in the electric drive mode, the wheels W slip and then regains their gripping force and the rotational speed decreases rapidly. This can effectively suppress occurrence of failure of the one-way clutch F.

(6) The above embodiment is described with respect to an example in which the rotation change detecting portion 71 detects the output rotation abrupt change state on the condition that it has been detected that the rotational acceleration of the output member O is equal to or lower than the abrupt change threshold value At that is set to a negative value. However, embodiments of the present invention are not limited to this. That is, for example, it is also one of preferred embodiments of the present invention that the rotation change detecting portion 71 be configured to detect the output rotation abrupt change state on the condition that it has been detected that the rotational acceleration of the output member O is equal to or higher than the abrupt change threshold value At that is set to a positive value. In other words, the rotation change detecting portion 71 can be configured to detect the output rotation abrupt change state on the condition that it has been detected that the absolute value of the rotational acceleration of the output member O is equal to or larger than the absolute value of the abrupt change threshold value At that is set to a predetermined value.

(7) The above embodiment is described with respect to an example in which the control threshold value Nt is set by adding the predetermined margin to the predicted variation $\Delta N$ in rotational speed of the input rotating element Ei in the negative direction in the output rotation abrupt change state. However, embodiments of the present invention are not limited to this. That is, for example, it is also one of preferred embodiments of the present invention that the control threshold value Nt be set as the predicted variation $\Delta N$ itself in rotational speed of the input rotating element Ei in the negative direction in the output rotation abrupt change state without adding such a predetermined margin.

(8) The above embodiment is described with respect to an example in which two conditions that should be satisfied at the same time, namely (A) the low rotation state has been established in which the rotational speed of the input rotating element Ei is lower than the control threshold value Nt, and (B) the output rotation abrupt change state has been detected by the rotation change detecting portion 71, are set as the initiation conditions for executing the restriction avoidance control by the restriction avoidance control portion 73. However, embodiments of the present invention are not limited to this. That is, such a condition may be set that particularly specifies a situation in which the low rotation state is established. For example, if it has been found as in the above embodiment that the low rotation state is always established in the second electric drive mode that is implemented when the one-way clutch F is in the negative-rotation restricting state, the condition (C) that the second electric drive mode has been selected by the drive-mode determining portion 77 or the condition (D) that the one-way clutch F is in the negative-rotation restricting state, etc. may be set instead of the above condition (A).

Note that in the configuration in which the friction engagement device CL capable of canceling driving coupling between the input member I and the input rotating element Ei is not provided, and the input member I is drivingly coupled to the input rotating element Ei so as to always rotate together therewith, there are many cases even in the first electric drive mode where the rotational speed of the input rotating element Ei is maintained at a value close to zero due to the friction resistance inside the internal combustion engine E in the combustion stop state, and the low rotation state is established. Thus, in such a case, the condition (E) that the electric drive mode (including both the first electric drive mode and the second electric drive mode) has been selected by the drive-mode determining portion 77 may be set instead of the above condition (C).

(9) The above embodiment is described with respect to an example in which the target rotational speed determining portion 74 determines the target rotational speed of the first rotating electrical machine MG1 by referring to the target rotational speed data 6a provided in advance. However, embodiments of the present invention are not limited to this. That is, it is also one of preferred embodiments of the present invention that the target rotational speed determining portion 74 is configured to determine the target rotational speed of the first rotating electrical machine MG1 by calculation based on a predetermined relational expression with the actual rotational speed of the output member O, without referring to such target rotational speed data 6a. The predetermined relational expression as used herein refers to an expression representing the relation among the rotational speed of the output member O, the speed ratio $\rho$ from the output member O to the output rotating element Eo by the power transmission system, the gear ratio $\lambda$ of the differential gear unit DG, the control threshold value Nt, and the target rotational speed of the first rotating electrical machine MG1.

(10) The above embodiment is described with respect to an example in which during the restriction avoidance control, the target rotational speed of the first rotating electrical machine MG1 is successively corrected according to a change in rotational speed of the output member O. However, embodiments of the present invention are not limited to this. That is, for example, it is also one of preferred embodiments of the present invention that the target rotational speed of the first rotating electrical machine MG1 be determined based on the rotational speed of the output member O at the time the output rotational abrupt change state is detected for the first time by the rotation change detecting portion 71, and this target rotational speed be maintained at a constant value during the restriction avoidance control. Alternatively, it is also one of the preferred embodiments of the present invention that, the target rotational speed of the first rotating electrical machine MG1 be determined based on the rotational speed of the output member O at each point every time the output rotational abrupt change state is detected by the rotation change detecting portion 71, and the target rotational speed is corrected stepwise during the restriction avoidance control.

(11) The above embodiment is described with respect to an example in which the restriction avoidance control is terminated if no output rotation abrupt change state is additionally detected before the predetermined termination determination time Tt elapses after detection of the output rotation abrupt change state by the rotation change detecting portion 71. However, embodiments of the present invention are not limited to this. That is, for example, it is also one of preferred embodiments of the present invention that the restriction avoidance control be terminated if the predetermined time has elapsed since the output rotation abrupt change state was detected by the rotation change detecting portion 71 for the first time. Alternatively, it is also one of the preferred embodiments of the present invention that the restriction avoidance control be terminated if the vehicle speed becomes zero (the vehicle is stopped). Moreover, it is also one of the preferred embodiments of the present invention that in the configuration in which the rotation change detecting portion 71 detects the output rotation abrupt change state based only on the ABS operation command, the restriction avoidance control be terminated if the ABS operation command is cancelled or if a predetermined time has elapsed since the ABS operation command was cancelled.

(12) The above embodiment is described with respect to an example in which the differential gear unit DG is formed by the single-pinion type planetary gear mechanism PG. However, embodiments of the present invention are not limited to this. That is, the differential gear unit DG may be formed by a double-pinion type planetary gear mechanism or a Ravigneaux type planetary gear mechanism. In the case where the differential gear unit DG has four or more rotating elements, a configuration in which part of the rotating elements of two or more planetary gear mechanisms may be coupled to each other, for example, may be employed.

(13) The above embodiment is described with respect to an example in which the friction engagement device CL is configured as a hydraulically operated friction engagement device. However, embodiments of the present invention are not limited to this. That is, an electromagnetic friction engagement device whose engagement pressure is controlled according to an electromagnetic force may be used as the friction engagement device CL.

(14) The above embodiment is described with respect to an example in which the internal combustion engine control unit 3 is provided separately from the control device 70. However, embodiments of the present invention are not limited to this. That is, the internal combustion engine control unit 3 may be integrated with the control device 70. Assignment of each function unit described in the above embodiment is by way of example only, and a plurality of function units may be combined, or one function unit may further be divided.

(15) Regarding other configurations as well, the embodiments disclosed in the specification are by way of example in all respects, and embodiments of the present invention are not limited to them. That is, the configurations that are not described in the claims can be modified as appropriate without departing from the object of the present invention.

The present invention can be preferably used for vehicle drive devices including an input member drivingly coupled to an internal combustion engine, an output member drivingly coupled to wheels, a first rotating electrical machine, a second rotating electrical machine, a differential gear unit having at least three rotating elements, and a control device.

What is claimed is:

1. A vehicle drive device, comprising:
an input member drivingly coupled to an internal combustion engine;
an output member drivingly coupled to wheels;
a first rotating electrical machine;
a second rotating electrical machine;
a differential gear unit having at least three rotating elements; and
a control device; and
a one-way clutch that restricts negative rotation of the input rotating element, wherein
the first rotating electrical machine, the input member, and the output member are respectively drivingly coupled to the different rotating elements of the differential gear unit with none of the rotating elements of the differential gear unit other than the coupled rotating element interposed therebetween,
the second rotating electrical machine is drivingly coupled to one of the rotating elements of the differential gear unit other than the rotating element to which the first rotating electrical machine is drivingly coupled and an input rotating element, which is the rotating element to which the input member is drivingly coupled, with none of the remaining rotating elements of the differential gear unit interposed therebetween, and
the control device includes
a rotation change detecting portion that detects an output rotation abrupt change state in which an absolute value of rotational acceleration of the output member is equal to or larger than a predetermined value, and
a restriction avoidance control portion that executes, if the output rotation abrupt change state is detected in a low rotation state in which a rotational speed of the input rotating element is lower than a predetermined control threshold value, restriction avoidance control in which a rotational speed of the first rotating electrical machine is controlled so that the rotational speed of a input rotating element becomes equal to or higher than the control threshold value.

2. The vehicle drive device according to claim 1, wherein the control threshold value is a value equal to or larger than a variation in the rotational speed of the input rotating element in a negative direction in the output rotation abrupt change state.

3. The vehicle drive device according to claim 2, wherein target rotational speed data is provided in advance which defines a relation between a rotational speed of the output member and a target rotational speed of the first rotating electrical machine that makes the rotational speed of the input rotating element equal to or higher than the control threshold value, and
the restriction avoidance control portion determines the target rotational speed of the first rotating electrical machine based on the target rotational speed data and an actual rotational speed of the output member, and controls the rotational speed of the first rotating electrical machine so that the rotational speed of the first rotating electrical machine becomes equal to the target rotational speed.

4. The vehicle drive device according to claim 3, wherein the restriction avoidance control portion determines a target rotational speed of the first rotating electrical machine based on an actual rotational speed of the output member, the control threshold value, and a gear ratio of the differential gear unit, and controls the rotational speed of the first rotating electrical machine so that the rotational speed of the first rotating electrical machine becomes equal to the target rotational speed.

5. The vehicle drive device according to claim 3, wherein the rotation change detecting portion detects the output rotation abrupt change state by detecting that the rotational acceleration of the output member is equal to or higher than a predetermined abrupt change threshold value that is set to a value larger in the negative direction than the rotational acceleration of the output member according to vehicle negative acceleration during braking of a vehicle.

6. The vehicle drive device according to claim 5, wherein the rotation change detecting portion detects the output rotation abrupt change state by detecting activation of an antilock brake system of the vehicle.

7. The vehicle drive device according to claim 6, wherein the restriction avoidance control portion terminates the restriction avoidance control if the rotation change detecting portion does not additionally detect the output rotation abrupt change state before a predetermined termination determination time elapses after detection of the output rotation abrupt change state.

8. The vehicle drive device according to claim 7, wherein rotational speeds of the at least three rotating elements of the differential gear unit are in an order of the rotating element to which the first rotating electrical machine is drivingly coupled, the input rotating element, and the rotating element to which the output member is drivingly coupled.

9. The vehicle drive device according to claim 8, further comprising:
a friction engagement device capable of canceling driving coupling between the input member and the input rotating element coupled to the one-way clutch.

10. The vehicle drive device according to claim 1, wherein target rotational speed data is provided in advance which defines a relation between a rotational speed of the output member and a target rotational speed of the first rotating electrical machine that makes the rotational speed of the input rotating element equal to or higher than the control threshold value, and
the restriction avoidance control portion determines the target rotational speed of the first rotating electrical machine based on the target rotational speed data and an actual rotational speed of the output member, and controls the rotational speed of the first rotating electrical machine so that the rotational speed of the first rotating electrical machine becomes equal to the target rotational speed.

11. The vehicle drive device according to claim 1, wherein the restriction avoidance control portion determines a target rotational speed of the first rotating electrical machine based on an actual rotational speed of the output member, the control threshold value, and a gear ratio of the differential gear unit, and controls the rotational speed of the first rotating electrical machine so that the rotational speed of the first rotating electrical machine becomes equal to the target rotational speed.

12. The vehicle drive device according to claim 1, wherein the rotation change detecting portion detects the output rotation abrupt change state by detecting that the rotational acceleration of the output member is equal to or higher than a predetermined abrupt change threshold value that is set to a value larger in the negative direction than the rotational acceleration of the output member according to vehicle negative acceleration during braking of a vehicle.

13. The vehicle drive device according to claim 6, wherein the rotation change detecting portion detects the output rotation abrupt change state by detecting activation of an antilock brake system of the vehicle.

14. The vehicle drive device according to claim 7, wherein the restriction avoidance control portion terminates the restriction avoidance control if the rotation change detecting portion does not additionally detect the output rotation abrupt change state before a predetermined termination determination time elapses after detection of the output rotation abrupt change state.

15. The vehicle drive device according to claim 1, wherein rotational speeds of the at least three rotating elements of the differential gear unit are in an order of the rotating element to which the first rotating electrical machine is drivingly coupled, the input rotating element, and the rotating element to which the output member is drivingly coupled.

16. The vehicle drive device according to claim to 1, further comprising:
a friction engagement device capable of canceling driving coupling between the input member and the input rotating element coupled to the one-way clutch.

17. The vehicle drive device according to claim 2, wherein the restriction avoidance control portion determines a target rotational speed of the first rotating electrical machine based on an actual rotational speed of the output member, the control threshold value, and a gear ratio of the differential gear unit, and controls the rotational speed of the first rotating electrical machine so that the rotational speed of the first rotating electrical machine becomes equal to the target rotational speed.

18. The vehicle drive device according to claim 2, wherein the rotation change detecting portion detects the output rotation abrupt change state by detecting that the rotational acceleration of the output member is equal to or higher than a predetermined abrupt change threshold value that is set to a value larger in the negative direction than the rotational acceleration of the output member according to vehicle negative acceleration during braking of a vehicle.

19. The vehicle drive device according to claim 2, wherein the rotation change detecting portion detects the output rotation abrupt change state by detecting activation of an antilock brake system of the vehicle.

20. The vehicle drive device according to claim 2, wherein the restriction avoidance control portion terminates the restriction avoidance control if the rotation change detecting portion does not additionally detect the output rotation abrupt change state before a predetermined termination determination time elapses after detection of the output rotation abrupt change state.

21. The vehicle drive device according to claim 2, wherein rotational speeds of the at least three rotating elements of the differential gear unit are in an order of the rotating element to which the first rotating electrical machine is drivingly coupled, the input rotating element, and the rotating element to which the output member is drivingly coupled.

22. The vehicle drive device according to claim to 2, further comprising:

a friction engagement device capable of canceling driving coupling between the input member and the input rotating element coupled to the one-way clutch.

* * * * *